(12) United States Patent
Crisp, III

(10) Patent No.: US 8,290,616 B2
(45) Date of Patent: *Oct. 16, 2012

(54) APPLIANCE HAVING A USER INTERFACE PANEL AND A BEVERAGE DISPENSER

(75) Inventor: Harry Lee Crisp, III, Marion, IL (US)

(73) Assignee: Beverage Works, Inc., Marion, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,204

(22) Filed: Jan. 9, 2012

(65) Prior Publication Data
US 2012/0109386 A1    May 3, 2012

Related U.S. Application Data

(63) Continuation of application No. 12/817,680, filed on Jun. 17, 2010, now Pat. No. 8,103,378, which is a continuation of application No. 11/422,514, filed on Jun. 6, 2006, now Pat. No. 7,754,025, which is a continuation of application No. 10/930,306, filed on Aug. 31, 2004, now Pat. No. 7,204,259, which is a continuation of application No. 10/035,734, filed on Oct. 22, 2001, now Pat. No. 6,799,085, which is a continuation of application No. 09/790,349, filed on Feb. 21, 2001, now abandoned, which is a continuation-in-part of application No. 09/589,725, filed on Jun. 8, 2000, now Pat. No. 6,751,525.

(51) Int. Cl.
*G06F 17/00* (2006.01)
(52) U.S. Cl. .......... 700/236; 700/237; 700/239; 700/240
(58) Field of Classification Search ........................ None
See application file for complete search history.

(56) References Cited

U.S. PATENT DOCUMENTS 2,138,943 A    12/1938    Sinkwich
(Continued)

FOREIGN PATENT DOCUMENTS

AU    497740    1/1979
(Continued)

OTHER PUBLICATIONS

"As I Was Saying to My Refrigerator . . . " article, written by James C. Fanning, published in Business Week E.BIZ (pp. EB40-EB41), dated Sep. 18, 2000.

(Continued)

*Primary Examiner* — Mussa A Shaawat
(74) *Attorney, Agent, or Firm* — Neal, Gerber & Eisenberg LLP

(57) ABSTRACT

An appliance including a housing, a dispenser, and a water supply mechanism. The appliance includes a drink supply mechanism configured to removably hold a plurality of drink supply containers, a user interface panel, and a computer. The computer is configured to: cause the user interface panel to display a plurality of different images, each image associated with a different one of a plurality of different beverages which correspond to a drink supply in at least one of the plurality of drink supply containers held by the drink supply mechanism, enable the user interface panel to receive an input from a user of a selected one of the plurality of different displayed images, and after receiving the input from the user of the selected one of the plurality of different displayed images, cause the dispenser to dispense the beverage corresponding to the selected image.

11 Claims, 20 Drawing Sheets

U.S. PATENT DOCUMENTS

| | | |
|---|---|---|
| 2,317,548 A | 4/1943 | Miller |
| 2,552,852 A | 5/1951 | Idle |
| 2,573,787 A | 11/1951 | Ganahl et al. |
| 2,679,850 A | 6/1954 | Kamp |
| 2,809,648 A | 10/1957 | Martiniak |
| 2,834,364 A | 5/1958 | Federighi et al. |
| 2,841,176 A | 7/1958 | Buss |
| 2,859,760 A | 11/1958 | Borell |
| 2,861,581 A | 11/1958 | Ryckman, Jr. |
| 2,895,646 A | 7/1959 | Federighi |
| 2,939,612 A | 6/1960 | Thompson |
| 3,013,568 A | 12/1961 | Getchell et al. |
| 3,019,802 A | 2/1962 | Mercer |
| 3,130,738 A | 4/1964 | Kays et al. |
| 3,207,373 A | 9/1965 | Dannenmann |
| 3,212,675 A | 10/1965 | Krzewina |
| 3,233,782 A | 2/1966 | Ullman, Jr. et al. |
| 3,283,530 A | 11/1966 | Bayne et al. |
| 3,370,535 A | 2/1968 | Martiniak |
| 3,370,597 A | 2/1968 | Fox |
| 3,376,085 A | 4/1968 | McPherson |
| 3,409,175 A | 11/1968 | Byrne |
| 3,436,525 A | 4/1969 | Stanford |
| 3,478,757 A | 11/1969 | Tuthill |
| 3,545,652 A | 12/1970 | Davis |
| 3,666,143 A | 5/1972 | Weston |
| 3,680,784 A | 8/1972 | Fakes |
| 3,707,160 A | 12/1972 | Query |
| 3,749,288 A | 7/1973 | Wade |
| 3,773,060 A | 11/1973 | Byrd |
| 3,827,600 A | 8/1974 | Janke |
| 3,850,185 A | 11/1974 | Guth |
| 3,878,970 A | 4/1975 | Nezworski |
| 3,896,827 A | 7/1975 | Robinson |
| 3,904,079 A | 9/1975 | Kross |
| 3,934,822 A | 1/1976 | Ross |
| 3,938,639 A | 2/1976 | Birrell |
| 3,940,019 A | 2/1976 | Kross et al. |
| 3,949,903 A | 4/1976 | Benasutti et al. |
| 3,960,298 A | 6/1976 | Birrell |
| 3,980,206 A | 9/1976 | Hancock |
| 3,991,911 A | 11/1976 | Shannon et al. |
| 3,995,441 A | 12/1976 | McMillin |
| 4,009,801 A | 3/1977 | Williams |
| 4,076,145 A | 2/1978 | Zygiel |
| 4,076,146 A | 2/1978 | Lausberg et al. |
| 4,143,793 A | 3/1979 | McMillin et al. |
| 4,149,654 A | 4/1979 | Nelson et al. |
| 4,149,655 A | 4/1979 | Nelson et al. |
| 4,149,656 A | 4/1979 | Nelson |
| 4,149,657 A | 4/1979 | Nelson et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,213,338 A | 7/1980 | Hardy |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,264,019 A | 4/1981 | Roberts et al. |
| 4,265,376 A | 5/1981 | Skidell |
| 4,269,330 A | 5/1981 | Johnson |
| 4,329,563 A | 5/1982 | Komura et al. |
| 4,329,596 A | 5/1982 | Marcade |
| 4,333,587 A | 6/1982 | Fessler et al. |
| 4,341,382 A | 7/1982 | Arnold |
| 4,354,613 A | 10/1982 | Desai et al. |
| 4,358,171 A | 11/1982 | Christen |
| 4,377,246 A | 3/1983 | McMillin et al. |
| 4,392,588 A | 7/1983 | Scalera |
| 4,413,752 A | 11/1983 | McMillin et al. |
| 4,420,005 A | 12/1983 | Armstrong |
| 4,431,559 A | 2/1984 | Ulrich |
| 4,440,382 A | 4/1984 | Pruvot et al. |
| 4,458,584 A | 7/1984 | Annese et al. |
| 4,466,342 A | 8/1984 | Basile et al. |
| 4,475,448 A | 10/1984 | Shoaf et al. |
| 4,496,078 A | 1/1985 | Nelzow et al. |
| 4,509,690 A | 4/1985 | Austin et al. |
| 4,520,950 A | 6/1985 | Jeans |
| 4,545,917 A | 10/1985 | Smith et al. |
| 4,549,675 A | 10/1985 | Austin |
| 4,553,573 A | 11/1985 | McGarrah |
| 4,557,283 A | 12/1985 | Shaw |
| 4,560,089 A | 12/1985 | McMillin et al. |
| 4,566,287 A | 1/1986 | Schmidt et al. |
| 4,568,081 A | 2/1986 | Martin |
| 4,577,782 A | 3/1986 | Fessler |
| 4,582,223 A | 4/1986 | Kobe |
| RE32,179 E | 6/1986 | Sedam et al. |
| 4,629,090 A | 12/1986 | Harris et al. |
| 4,634,824 A | 1/1987 | Takano |
| 4,651,862 A | 3/1987 | Greenfield, Jr. |
| 4,658,988 A | 4/1987 | Hassell |
| 4,666,430 A | 5/1987 | Brown et al. |
| 4,687,120 A | 8/1987 | McMillin |
| 4,708,266 A | 11/1987 | Rudick |
| 4,709,835 A | 12/1987 | Kruger et al. |
| 4,711,374 A | 12/1987 | Gaunt et al. |
| 4,719,056 A | 1/1988 | Scott |
| 4,726,494 A | 2/1988 | Scott |
| 4,732,171 A | 3/1988 | Milocco |
| 4,747,516 A | 5/1988 | Baker |
| 4,756,321 A | 7/1988 | Livingston et al. |
| 4,765,513 A | 8/1988 | McMillin et al. |
| 4,766,548 A | 8/1988 | Cedrone et al. |
| 4,781,309 A | 11/1988 | Vogel |
| 4,791,411 A | 12/1988 | Starr |
| 4,799,606 A | 1/1989 | Vershbow |
| 4,800,492 A | 1/1989 | Johnson et al. |
| 4,804,006 A | 2/1989 | Shaw |
| 4,805,647 A | 2/1989 | Marks |
| 4,819,183 A | 4/1989 | O'Brien et al. |
| 4,820,934 A | 4/1989 | Marcade et al. |
| 4,821,925 A | 4/1989 | Wiley et al. |
| 4,824,075 A | 4/1989 | Holzboog |
| 4,827,426 A | 5/1989 | Patton et al. |
| 4,836,229 A | 6/1989 | Lakhan et al. |
| 4,850,269 A | 7/1989 | Hancock et al. |
| 4,856,684 A | 8/1989 | Gerstung |
| 4,860,923 A | 8/1989 | Kirschner et al. |
| 4,865,228 A | 9/1989 | Landecker |
| 4,866,949 A | 9/1989 | Rudick |
| 4,901,887 A | 2/1990 | Burton |
| 4,908,746 A | 3/1990 | Vaughn |
| 4,921,139 A | 5/1990 | Fischer et al. |
| 4,921,315 A | 5/1990 | Metcalfe et al. |
| 4,930,666 A | 6/1990 | Rudick |
| 4,932,564 A | 6/1990 | Austin et al. |
| 4,936,331 A | 6/1990 | Sundberg |
| 4,936,488 A | 6/1990 | Austin |
| 4,937,019 A | 6/1990 | Scott |
| 4,938,240 A | 7/1990 | Lakhan et al. |
| 4,960,254 A | 10/1990 | Hartke |
| 4,960,261 A | 10/1990 | Scott et al. |
| 4,961,533 A | 10/1990 | Teller et al. |
| 4,974,643 A | 12/1990 | Bennett et al. |
| 4,979,641 A | 12/1990 | Turner |
| 4,982,876 A | 1/1991 | Scott |
| 4,993,604 A | 2/1991 | Gaunt et al. |
| 5,000,357 A | 3/1991 | Shannon et al. |
| 5,005,740 A | 4/1991 | Marks et al. |
| 5,007,560 A | 4/1991 | Sassak |
| 5,031,649 A | 7/1991 | Marks et al. |
| 5,033,645 A | 7/1991 | Shannon et al. |
| 5,033,659 A | 7/1991 | Marks et al. |
| 5,040,106 A | 8/1991 | Maag |
| 5,044,171 A | 9/1991 | Farkas |
| 5,091,713 A | 2/1992 | Horne et al. |
| 5,118,009 A | 6/1992 | Novitsky |
| 5,129,548 A | 7/1992 | Wisniewski |
| 5,129,549 A | 7/1992 | Austin |
| 5,139,182 A | 8/1992 | Appla |
| 5,139,708 A | 8/1992 | Scott |
| 5,156,301 A | 10/1992 | Hassell et al. |
| 5,156,823 A | 10/1992 | Hori et al. |

| Patent | | Date | Inventor |
|---|---|---|---|
| 5,156,871 | A | 10/1992 | Goulet et al. |
| 5,165,575 | A | 11/1992 | Scott |
| 5,176,297 | A | 1/1993 | Mooney et al. |
| 5,181,540 | A | 1/1993 | Campau |
| 5,186,912 | A | 2/1993 | Steindorf et al. |
| 5,190,083 | A | 3/1993 | Gupta et al. |
| 5,190,189 | A | 3/1993 | Zimmer et al. |
| 5,193,562 | A | 3/1993 | Rigby et al. |
| 5,193,718 | A | 3/1993 | Hassell et al. |
| 5,203,474 | A | 4/1993 | Haynes |
| 5,205,304 | A | 4/1993 | Cooper et al. |
| 5,211,678 | A | 5/1993 | Stephenson et al. |
| 5,228,312 | A | 7/1993 | Williams |
| 5,228,486 | A | 7/1993 | Henninger |
| 5,235,994 | A | 8/1993 | Comin et al. |
| 5,240,144 | A | 8/1993 | Feldman |
| 5,261,432 | A | 11/1993 | Sandrin |
| 5,263,509 | A | 11/1993 | Cherry et al. |
| 5,269,156 | A | 12/1993 | van de Velde et al. |
| 5,269,442 | A | 12/1993 | Vogel |
| 5,272,321 | A | 12/1993 | Otsuka et al. |
| 5,280,711 | A | 1/1994 | Motta et al. |
| 5,288,331 | A | 2/1994 | Rings et al. |
| 5,297,400 | A | 3/1994 | Benton et al. |
| 5,303,846 | A | 4/1994 | Shannon |
| 5,310,090 | A | 5/1994 | Taylor, Jr. |
| 5,320,817 | A | 6/1994 | Hardwick et al. |
| 5,343,716 | A | 9/1994 | Swanson et al. |
| 5,350,082 | A | 9/1994 | Kiriakides, Jr. et al. |
| 5,368,198 | A | 11/1994 | Goulet |
| 5,392,960 | A | 2/1995 | Kendt et al. |
| 5,396,914 | A | 3/1995 | McNair |
| 5,411,179 | A | 5/1995 | Oyler et al. |
| 5,417,146 | A | 5/1995 | Zimmer et al. |
| 5,437,395 | A | 8/1995 | Bull et al. |
| 5,454,406 | A | 10/1995 | Rejret et al. |
| 5,464,124 | A | 11/1995 | Weyh et al. |
| 5,492,250 | A | 2/1996 | Sardynski |
| 5,494,061 | A | 2/1996 | Chan et al. |
| 5,507,420 | A | 4/1996 | O'Neill |
| 5,535,216 | A | 7/1996 | Goldman et al. |
| 5,538,160 | A | 7/1996 | Ziesel |
| 5,542,265 | A | 8/1996 | Rutland |
| 5,553,746 | A | 9/1996 | Jones |
| 5,553,755 | A | 9/1996 | Bonewald et al. |
| 5,565,923 | A | 10/1996 | Zdepski |
| 5,568,882 | A | 10/1996 | Takacs |
| 5,570,587 | A | 11/1996 | Kim |
| 5,575,405 | A | 11/1996 | Stratton et al. |
| 5,588,025 | A | 12/1996 | Strolle et al. |
| 5,596,420 | A | 1/1997 | Daum |
| 5,596,501 | A | 1/1997 | Comer et al. |
| 5,603,230 | A | 2/1997 | Tsai |
| 5,607,083 | A | 3/1997 | Vogel et al. |
| 5,608,643 | A | 3/1997 | Wichter et al. |
| 5,611,867 | A | 3/1997 | Cooper et al. |
| 5,626,407 | A | 5/1997 | Westcott |
| 5,647,512 | A | 7/1997 | Assi Mascarenhas de Oliveira et al. |
| 5,667,110 | A | 9/1997 | McCann et al. |
| 5,694,794 | A | 12/1997 | Jerg et al. |
| 5,699,328 | A | 12/1997 | Ishizaki et al. |
| 5,703,877 | A | 12/1997 | Nuber et al. |
| 5,704,350 | A | 1/1998 | Williams, III |
| 5,706,191 | A | 1/1998 | Bassett et al. |
| 5,706,976 | A | 1/1998 | Purkey |
| 5,720,037 | A | 2/1998 | Biliris et al. |
| 5,721,693 | A | 2/1998 | Song |
| 5,732,563 | A | 3/1998 | Bethuy et al. |
| 5,742,623 | A | 4/1998 | Nuber et al. |
| 5,743,432 | A | 4/1998 | Barbe |
| 5,743,433 | A | 4/1998 | Hawkins et al. |
| 5,745,366 | A | 4/1998 | Highma et al. |
| RE35,780 | E | 5/1998 | Hassell et al. |
| 5,751,888 | A | 5/1998 | Fukuchi et al. |
| 5,774,053 | A | 6/1998 | Porter |
| 5,785,740 | A | 7/1998 | Brugerolle et al. |
| 5,791,517 | A | 8/1998 | Avital |
| 5,791,523 | A | 8/1998 | Oh |
| 5,797,519 | A | 8/1998 | Schroeder et al. |
| 5,803,320 | A | 9/1998 | Cutting et al. |
| 5,829,085 | A | 11/1998 | Jerg et al. |
| 5,839,291 | A | 11/1998 | Chang |
| 5,839,454 | A | 11/1998 | Matz |
| 5,845,815 | A | 12/1998 | Vogel |
| 5,855,296 | A | 1/1999 | McCann et al. |
| 5,856,973 | A | 1/1999 | Thompson |
| 5,862,961 | A | 1/1999 | Motta et al. |
| 5,875,930 | A | 3/1999 | Nakajima et al. |
| 5,899,245 | A | 5/1999 | Wrigley et al. |
| 5,900,801 | A | 5/1999 | Heagle et al. |
| 5,901,884 | A | 5/1999 | Goulet et al. |
| 5,907,285 | A | 5/1999 | Toms et al. |
| 5,915,407 | A | 6/1999 | West |
| 5,920,801 | A | 7/1999 | Thomas et al. |
| 5,947,330 | A | 9/1999 | Kim |
| 5,947,334 | A * | 9/1999 | Rudick et al. ............ 222/129.2 |
| 5,956,967 | A | 9/1999 | Kim |
| 5,967,367 | A | 10/1999 | Orsborn |
| 5,979,668 | A | 11/1999 | Kane et al. |
| 5,979,694 | A | 11/1999 | Bennett et al. |
| 5,980,959 | A | 11/1999 | Frutin |
| 5,984,512 | A | 11/1999 | Jones et al. |
| 5,987,105 | A | 11/1999 | Jenkins et al. |
| 5,988,346 | A | 11/1999 | Tedesco et al. |
| 5,993,739 | A | 11/1999 | Lyon |
| 5,995,877 | A | 11/1999 | Brueggemann et al. |
| 6,003,078 | A | 12/1999 | Kodimer et al. |
| 6,012,450 | A | 1/2000 | Rubsamen |
| 6,036,166 | A | 3/2000 | Olson |
| 6,039,219 | A | 3/2000 | Bach et al. |
| 6,041,970 | A | 3/2000 | Vogel |
| 6,045,007 | A | 4/2000 | Simmons |
| 6,056,194 | A | 5/2000 | Kolls |
| 6,061,399 | A | 5/2000 | Lyons et al. |
| 6,085,740 | A | 7/2000 | Ivri et al. |
| 6,092,540 | A | 7/2000 | Chiao |
| 6,101,452 | A | 8/2000 | Krall et al. |
| 6,115,537 | A | 9/2000 | Yamada et al. |
| 6,138,693 | A | 10/2000 | Matz |
| 6,155,457 | A | 12/2000 | Landa et al. |
| 6,161,059 | A | 12/2000 | Tedesco et al. |
| 6,176,399 | B1 | 1/2001 | Schantz et al. |
| 6,181,981 | B1 | 1/2001 | Varga et al. |
| 6,182,555 | B1 | 2/2001 | Scheer et al. |
| 6,189,551 | B1 | 2/2001 | Sargeant et al. |
| 6,204,763 | B1 | 3/2001 | Sone |
| 6,213,148 | B1 | 4/2001 | Wadsworth et al. |
| 6,217,004 | B1 | 4/2001 | Tanner |
| 6,230,767 | B1 | 5/2001 | Nelson |
| 6,234,223 | B1 | 5/2001 | Nelson |
| 6,234,349 | B1 | 5/2001 | Bilskie et al. |
| 6,237,812 | B1 | 5/2001 | Fukada |
| 6,244,277 | B1 | 6/2001 | Maunsell |
| 6,253,960 | B1 | 7/2001 | Bilskie et al. |
| 6,264,548 | B1 | 7/2001 | Payne et al. |
| 6,294,767 | B1 | 9/2001 | Sargeant et al. |
| 6,296,153 | B1 | 10/2001 | Bilskie et al. |
| 6,305,269 | B1 | 10/2001 | Stratton |
| 6,321,985 | B1 | 11/2001 | Kolls |
| 6,338,351 | B1 | 1/2002 | Schrott |
| 6,353,954 | B1 | 3/2002 | Dunsbergen et al. |
| 6,377,868 | B1 | 4/2002 | Gardner, Jr. |
| 6,394,311 | B2 | 5/2002 | McCann et al. |
| 6,401,733 | B1 | 6/2002 | Schrott et al. |
| 6,405,900 | B1 | 6/2002 | Kown |
| 6,411,462 | B1 | 6/2002 | Ostwald et al. |
| 6,447,081 | B1 | 9/2002 | Sargeant et al. |
| 6,453,917 | B1 | 9/2002 | Biechele |
| 6,457,038 | B1 | 9/2002 | Defosse |
| 6,491,047 | B2 | 12/2002 | Abe |
| 6,526,824 | B2 | 3/2003 | Chase et al. |
| 6,536,224 | B2 | 3/2003 | Frank et al. |
| 6,536,626 | B2 | 3/2003 | Newman et al. |
| 6,581,804 | B1 | 6/2003 | Ciavarella et al. |
| 6,607,105 | B2 | 8/2003 | Phelps et al. |
| 6,622,896 | B2 | 9/2003 | Hegeman et al. |
| 6,669,051 | B1 | 12/2003 | Phallen et al. |

| | | | | | | |
|---|---|---|---|---|---|---|
| 6,690,979 | B1 | 2/2004 | Smith | DE | 4125414 | 2/1993 |
| 6,751,525 | B1 | 6/2004 | Crisp, III | DE | 4214864 | 11/1993 |
| 6,766,656 | B1 | 7/2004 | Crisp, III et al. | DE | 4344205 | 6/1995 |
| 6,798,997 | B1 | 9/2004 | Hayward et al. | DE | 19602443 | 7/1997 |
| 6,799,085 | B1 | 9/2004 | Crisp, III | DE | 19757679 | 7/1998 |
| 6,848,600 | B1 | 2/2005 | Crisp, III | DE | 19740819 | 3/1999 |
| 6,851,581 | B2 | 2/2005 | Perucca et al. | DE | 19843976 | 4/1999 |
| 6,857,439 | B1 | 2/2005 | Perruca et al. | DE | 19808608 | 9/1999 |
| 6,857,541 | B1 | 2/2005 | Crisp, III | DE | 19820912 | 11/1999 |
| 6,896,159 | B2 | 5/2005 | Crisp, III et al. | DE | 19954706 | 5/2001 |
| 6,915,925 | B2 | 7/2005 | Crisp, III et al. | DE | 19960311 | 6/2001 |
| 6,923,191 | B2 | 8/2005 | Cerruti et al. | DE | 19960313 | 6/2001 |
| 6,986,263 | B2 | 1/2006 | Crisp, III | DE | 10028630 | 12/2001 |
| 6,997,196 | B2 | 2/2006 | Eiermann | DE | 10039408 | 12/2001 |
| 7,004,355 | B1 | 2/2006 | Crisp, III et al. | EP | 0010049 | 4/1980 |
| 7,032,779 | B2 | 4/2006 | Crisp, III | EP | 0083532 | 7/1983 |
| 7,032,780 | B2 | 4/2006 | Crisp, III | EP | 0128070 | 12/1984 |
| 7,083,071 | B1 | 8/2006 | Crisp, III et al. | EP | 0166586 | 1/1986 |
| 7,168,592 | B2 | 1/2007 | Crisp, III et al. | EP | 0190795 | 8/1986 |
| 7,203,572 | B2 | 4/2007 | Crisp, III | EP | 0207520 | 1/1987 |
| 7,204,259 | B2 | 4/2007 | Crisp, III | EP | 0236633 | 9/1987 |
| 7,278,552 | B2 | 10/2007 | Crisp, III | EP | 0258024 | 3/1988 |
| 7,284,561 | B2 | 10/2007 | Byrne et al. | EP | 0259080 | 3/1988 |
| 7,337,924 | B2 | 3/2008 | Crisp, III et al. | EP | 0301169 | 2/1989 |
| 7,356,381 | B2 | 4/2008 | Crisp, III | EP | 0329289 | 8/1989 |
| 7,367,480 | B2 | 5/2008 | Crisp, III | EP | 0332152 | 9/1989 |
| 7,389,895 | B2 | 6/2008 | Crisp, III | EP | 0346631 | 12/1989 |
| 7,416,097 | B2 | 8/2008 | Crisp, III et al. | EP | 0423044 | 4/1991 |
| 7,418,969 | B1 | 9/2008 | Crisp, III | EP | 0425286 | 5/1991 |
| 7,419,073 | B2 | 9/2008 | Crisp, III et al. | EP | 0461870 | 12/1991 |
| 7,438,285 | B2 | 10/2008 | Maritan et al. | EP | 0486790 | 5/1992 |
| 7,484,388 | B2 | 2/2009 | Crisp, III | EP | 0554676 | 8/1993 |
| 7,611,031 | B2 | 11/2009 | Crisp, III et al. | EP | 0593876 | 4/1994 |
| 7,689,476 | B2 | 3/2010 | Crisp, III | EP | 0599110 | 6/1994 |
| 7,708,172 | B2 | 5/2010 | Crisp, III et al. | EP | 0671143 | 9/1995 |
| 2001/0025862 | A1 | 10/2001 | Brown et al. | EP | 0691101 | 1/1996 |
| 2001/0049846 | A1 | 12/2001 | Guzzi et al. | EP | 0858768 | 8/1998 |
| 2002/0161652 | A1 | 10/2002 | Paullin et al. | EP | 0882423 | 12/1998 |
| 2004/0250564 | A1 | 12/2004 | Crisp, III et al. | EP | 0893091 | 1/1999 |
| 2005/0178144 | A1 | 8/2005 | Crisp, III | EP | 1236431 | 9/2002 |
| 2006/0113323 | A1 | 6/2006 | Jones | FR | 2486794 | 1/1982 |
| | | | | FR | 2582927 | 12/1986 |
| | | FOREIGN PATENT DOCUMENTS | | FR | 2591463 | 6/1987 |
| | | | | FR | 2593379 | 7/1987 |
| AU | | 513421 | 11/1980 | FR | 2593697 | 8/1989 |
| AU | | 599409 | 7/1990 | FR | 2644686 | 9/1990 |
| AU | | 1823092 | 12/1992 | FR | 2671950 | 7/1992 |
| AU | | 646461 | 2/1994 | FR | 2695021 | 3/1994 |
| AU | | 648133 | 4/1994 | FR | 2768829 | 3/1999 |
| AU | | 657540 | 3/1995 | GB | 171320 | 11/1921 |
| CA | | 475488 | 7/1951 | GB | 397731 | 8/1933 |
| CA | | 511151 | 3/1955 | GB | 549566 | 11/1942 |
| CA | | 522602 | 3/1956 | GB | 584112 | 1/1947 |
| CA | | 538407 | 3/1957 | GB | 683016 | 11/1952 |
| CA | | 544253 | 7/1957 | GB | 687824 | 2/1953 |
| CA | | 935739 | 10/1973 | GB | 698936 | 10/1953 |
| CA | | 1004492 | 2/1977 | GB | 725913 | 3/1955 |
| CA | | 1043230 | 11/1978 | GB | 762820 | 12/1956 |
| CA | | 1088849 | 11/1980 | GB | 795285 | 5/1958 |
| CA | | 1092476 | 12/1980 | GB | 867821 | 5/1961 |
| CA | | 1101759 | 5/1981 | GB | 876839 | 9/1961 |
| CA | | 1102220 | 6/1981 | GB | 889373 | 2/1962 |
| CA | | 2002823 | 5/1990 | GB | 916235 | 1/1963 |
| CA | | 1331947 | 9/1994 | GB | 920040 | 3/1963 |
| CN | | 2250328 | 3/1997 | GB | 985545 | 3/1965 |
| DE | | 1002494 | 2/1957 | GB | 1011877 | 12/1965 |
| DE | | 1952163 | 5/1971 | GB | 1012884 | 12/1965 |
| DE | | 2909449 | 9/1980 | GB | 1015524 | 1/1966 |
| DE | | 2921958 | 12/1980 | GB | 1028048 | 5/1966 |
| DE | | 2931842 | 2/1981 | GB | 1093594 | 12/1967 |
| DE | | 3527182 | 2/1987 | GB | 1126914 | 9/1968 |
| DE | | 3623027 | 1/1988 | GB | 1134483 | 11/1968 |
| DE | | 3640054 | 6/1988 | GB | 1147708 | 4/1969 |
| DE | | 3812109 | 10/1989 | GB | 1154464 | 6/1969 |
| DE | | 3833961 | 4/1990 | GB | 1168562 | 10/1969 |
| DE | | 3903636 | 8/1990 | GB | 1181905 | 2/1970 |
| DE | | 4103563 | 8/1991 | GB | 1187720 | 4/1970 |
| DE | | 4014359 | 11/1991 | GB | 1219878 | 1/1971 |
| DE | | 4014776 | 11/1991 | GB | 1244979 | 9/1971 |
| DE | | 4134786 | 7/1992 | | | |

| | | |
|---|---|---|
| GB | 1276443 | 6/1972 |
| GB | 1328866 | 9/1973 |
| GB | 1395951 | 5/1975 |
| GB | 1469338 | 4/1977 |
| GB | 2062015 | 5/1981 |
| GB | 2063658 | 6/1981 |
| GB | 2084120 | 4/1982 |
| GB | 2155772 | 10/1985 |
| GB | 2194433 | 3/1988 |
| GB | 2214524 | 9/1989 |
| GB | 2215992 | 10/1989 |
| GB | 2256362 | 12/1992 |
| GB | 2288191 | 10/1995 |
| GB | 2330522 | 4/1999 |
| IT | 1242096 | 2/1994 |
| JP | 1227730 | 9/1989 |
| JP | 3134455 | 6/1991 |
| JP | 4363570 | 12/1992 |
| JP | 5154082 | 6/1993 |
| JP | 6030874 | 2/1994 |
| JP | 6030875 | 2/1994 |
| JP | 6030877 | 2/1994 |
| JP | 6154147 | 6/1994 |
| JP | 7178027 | 7/1995 |
| JP | 8112237 | 5/1996 |
| JP | 8147544 | 6/1996 |
| JP | 8161615 | 6/1996 |
| JP | 8238134 | 9/1996 |
| JP | 9117404 | 5/1997 |
| JP | 9122060 | 5/1997 |
| JP | 9138731 | 5/1997 |
| JP | 9168499 | 6/1997 |
| JP | 10025000 | 1/1998 |
| JP | 11028451 | 2/1999 |
| JP | 2000157470 | 6/2000 |
| JP | 2000171958 | 6/2000 |
| JP | 2000185008 | 7/2000 |
| JP | 2000189372 | 7/2000 |
| JP | 2000237023 | 9/2000 |
| JP | 2000237024 | 9/2000 |
| JP | 2001070221 | 3/2001 |
| JP | 2001321315 | 11/2001 |
| NL | 1012852 | 2/2000 |
| NZ | 198959 | 3/1984 |
| NZ | 239901 | 7/1993 |
| NZ | 272575 | 5/1997 |
| PL | 245340 | 7/1985 |
| SE | 416933 | 2/1981 |
| WO | WO8200753 | 3/1982 |
| WO | WO8911443 | 11/1989 |
| WO | WO9100238 | 1/1991 |
| WO | WO9318701 | 9/1993 |
| WO | WO9511855 | 5/1995 |
| WO | WO9609790 | 4/1996 |
| WO | WO9903776 | 1/1999 |
| WO | WO9926860 | 6/1999 |
| WO | WO9965818 | 12/1999 |
| WO | WO0111281 | 2/2001 |
| WO | WO0196645 | 12/2001 |
| ZA | 7507398 | 11/1976 |
| ZA | 8701643 | 11/1988 |

OTHER PUBLICATIONS

Beverage Express advertisement, printed from www.beverageexpress.com on May 2, 2000 (2 pages).
BevStar Bottled Water Model advertisement., not dated, available prior to Jun. 2000 (2 pages).
BevStar Point of Use Water Model advertisement., not dated, available prior to Jun. 2000 (2 pages).
BreakMate™ advertisement, printed from www.bestrom.com on May 30, 2000 (6 pages).
"Best of the Web—General Electric" article, written by Erika Brown, published in Forbes (p. 80), dated May 21, 2001.
"Can Your Refrigerator Surf?" article, written by Eileen Smith, published in PC World, dated Jan. 6, 2000 (3 pages).
"Co's Join on Home Web Wiring Network" article, dated Jun. 5, 2000 (2 pages).
"Gone Flat" article, written by Daniel Fisher, published in Forbes (pp. 76-79), dated Oct. 15, 2001.
"The fridge that makes shopping 'Cool'" article, printed from www.icl.com on May 2, 2000 (2 pages).
The fuzzyLogic Beverage Dispenser—Remote Controlled or for Water Self-Service advertisement, printed from www.bonator.com on May 2, 2000 (3 pages).
"Introducing Internet Digital DIOS Refrigerator" advertisement, written by LG Electronics, dated Jun. 21, 2000 (2 pages).
Isoworth Beverage Dispensing Technology Worldwide Company brochure, not dated, available prior to Jun. 2000 (7 pages).
Isoworth Beverage Dispensing Technology Worldwide advertisement, printed from www.bevstar.com on May 22, 2000 (24 pages).
Margherita2000.com advertisement, printed from www.margherita2000.com on Jan. 26, 2001 (4 pages).
"Perspective Infopliance Nightmare, What's so smart about smart appliances?" article, written by Akiko Busch, published in Metropolis Magazine, dated Jul. 2000 (2 pages).
Soda—Club Enterprises advertisement, printed from www.sodaclubenterprises.com on May 2, 2000 (1 page).
"Coke chiefs latest Daft idea—a cola tap in every house" article, written by Rupert Steiner, published in Sunday Times, dated Mar. 18, 2001 (1 page).
"Sunbeam Joins Microsoft in University Plug and Play Forum" article, dated Mar. 23, 2000 (1 page).
Swiss Mountain Coffees advertisement, printed from www.ecommerce.dewpointinc.com on May 30, 2000 (2 pages).
"GE Smart Appliances Integrate Symbol Technologies Consumer Scanners, Computing Appliances at Kitchen & Bath Trade Show" advertisement, written by Symbol Technologies, printed from www.symbol.com on Dec. 12, 2000 (2 pages).
Tour a Virtual Trade Show article, printed from appliancemagazine.com on May 2, 2000 (2 pages).
"Help for Hurried Cooks?" article, written by Charles Wardell, published in Popular Science (p. 32), dated May 2000.
"Whirlpool Internet-Enabled Appliances to Use Beeline Shopper Software Features" article, written by Business Wire, printed on Feb. 16, 2001 (1 page).
"Wunder-Bar Dispensing Systems" advertisement, printed from www.wunderbar.com on May 2, 2000 (2 pages).

* cited by examiner

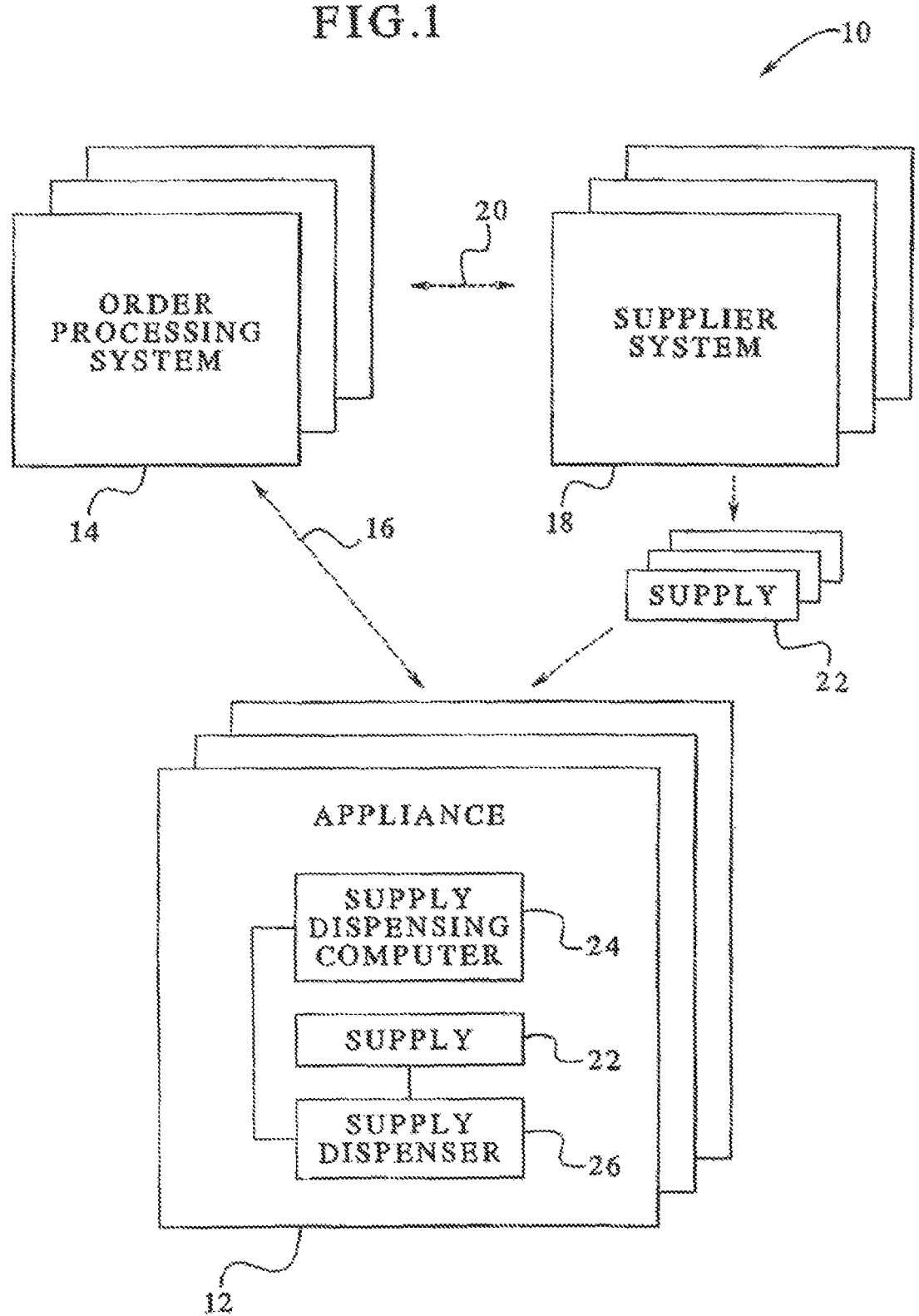

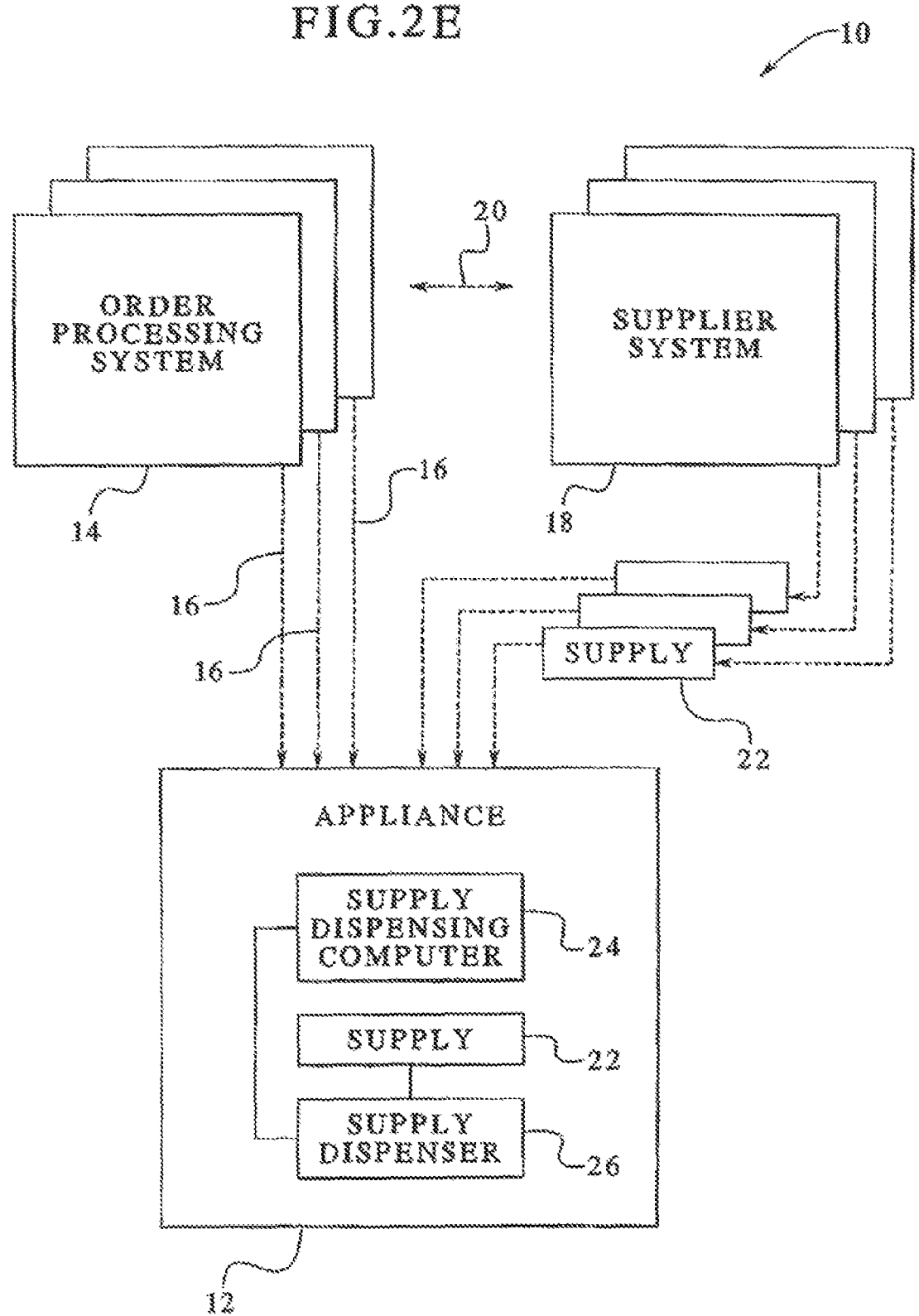

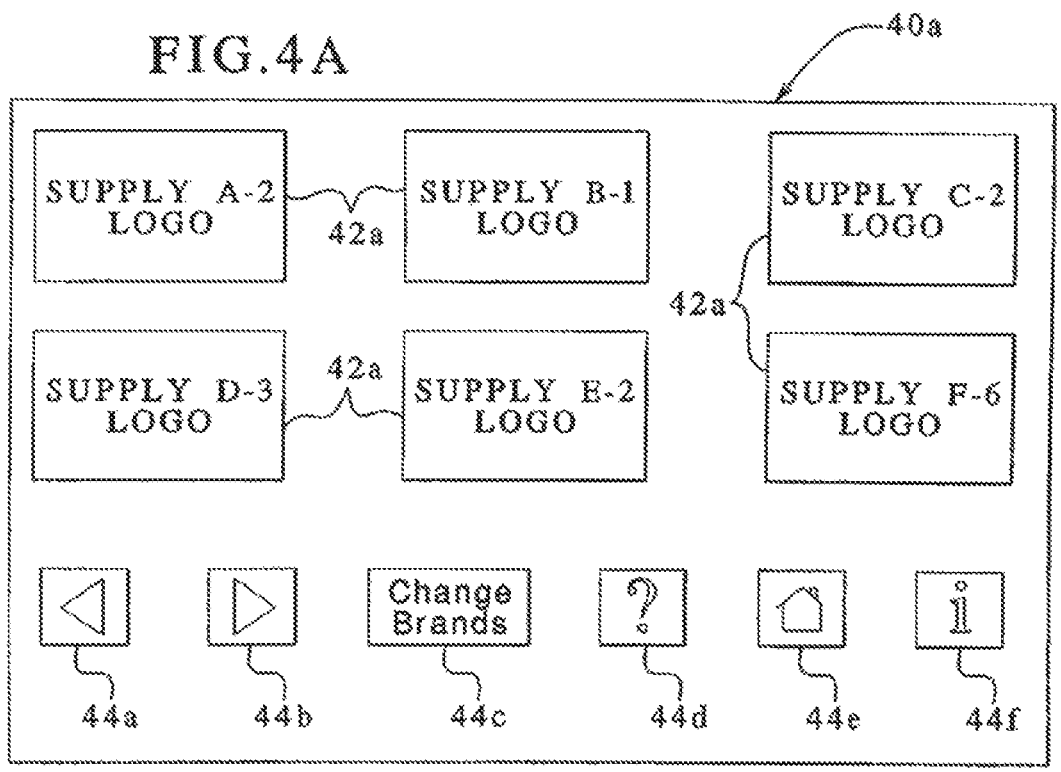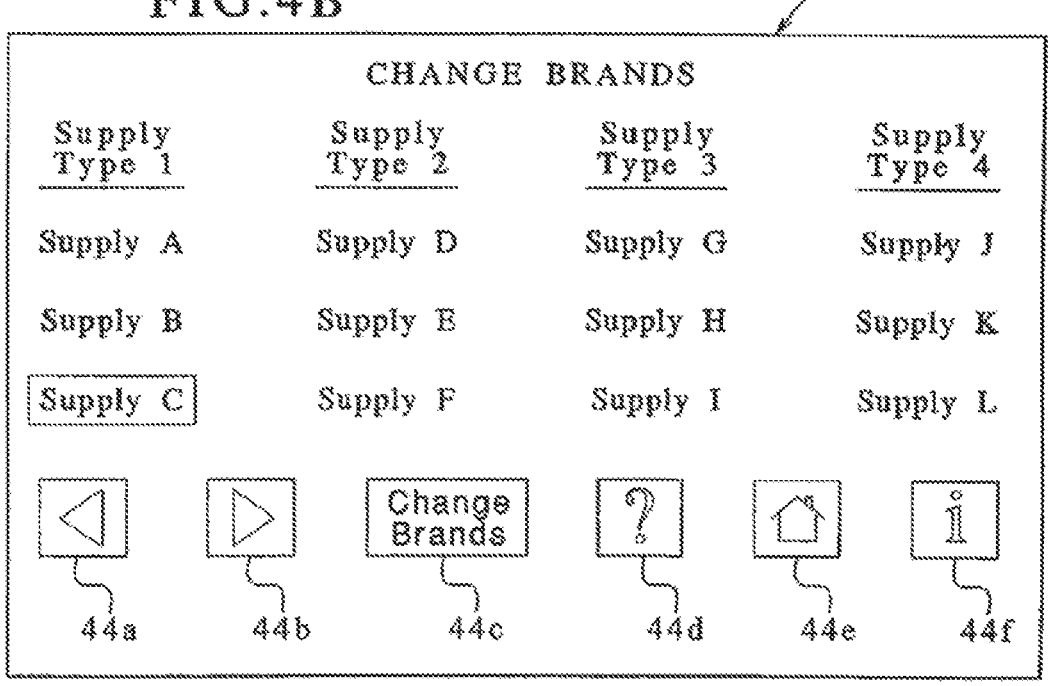

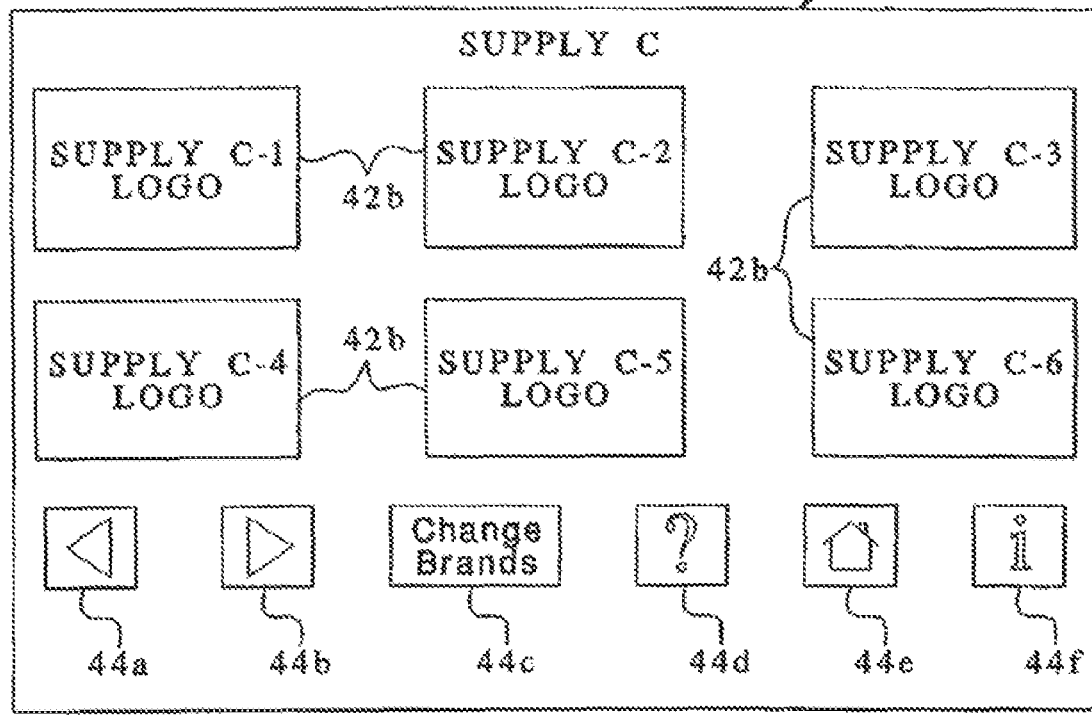
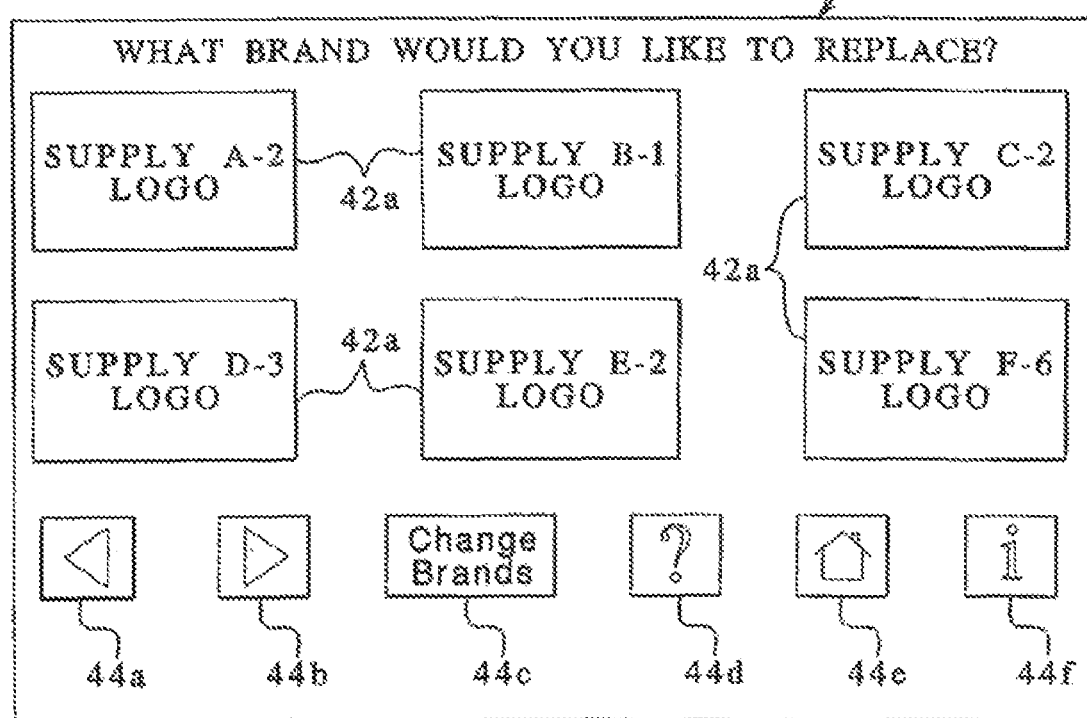

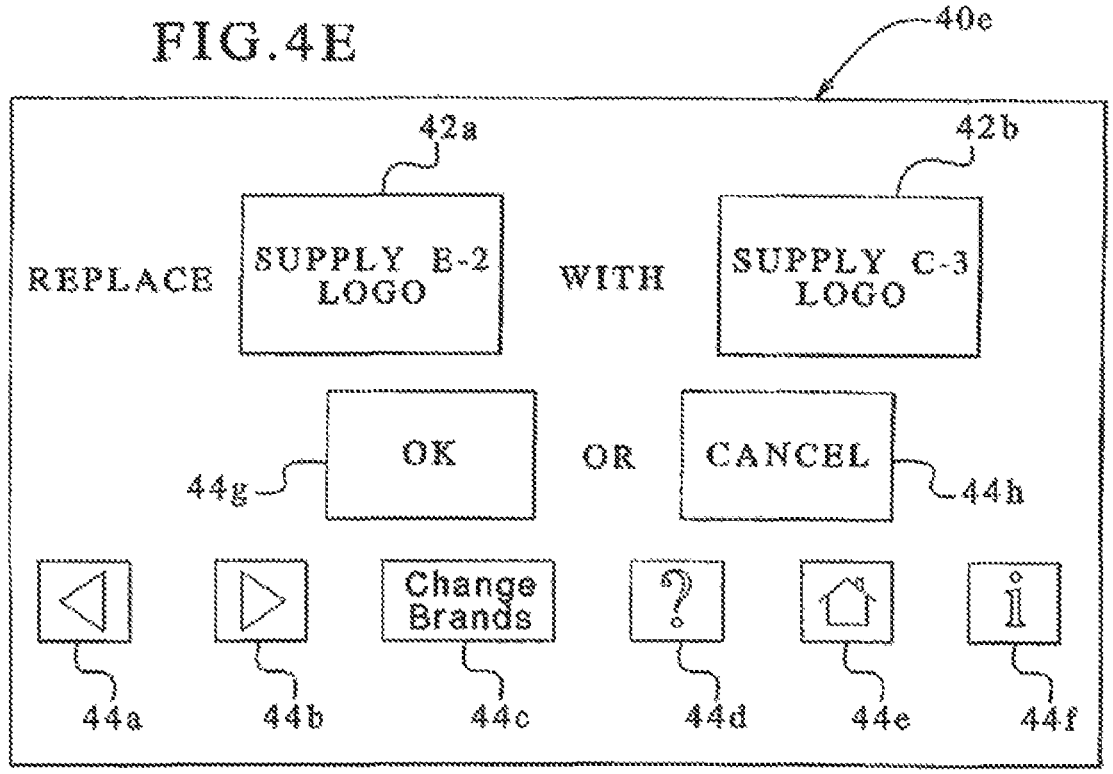

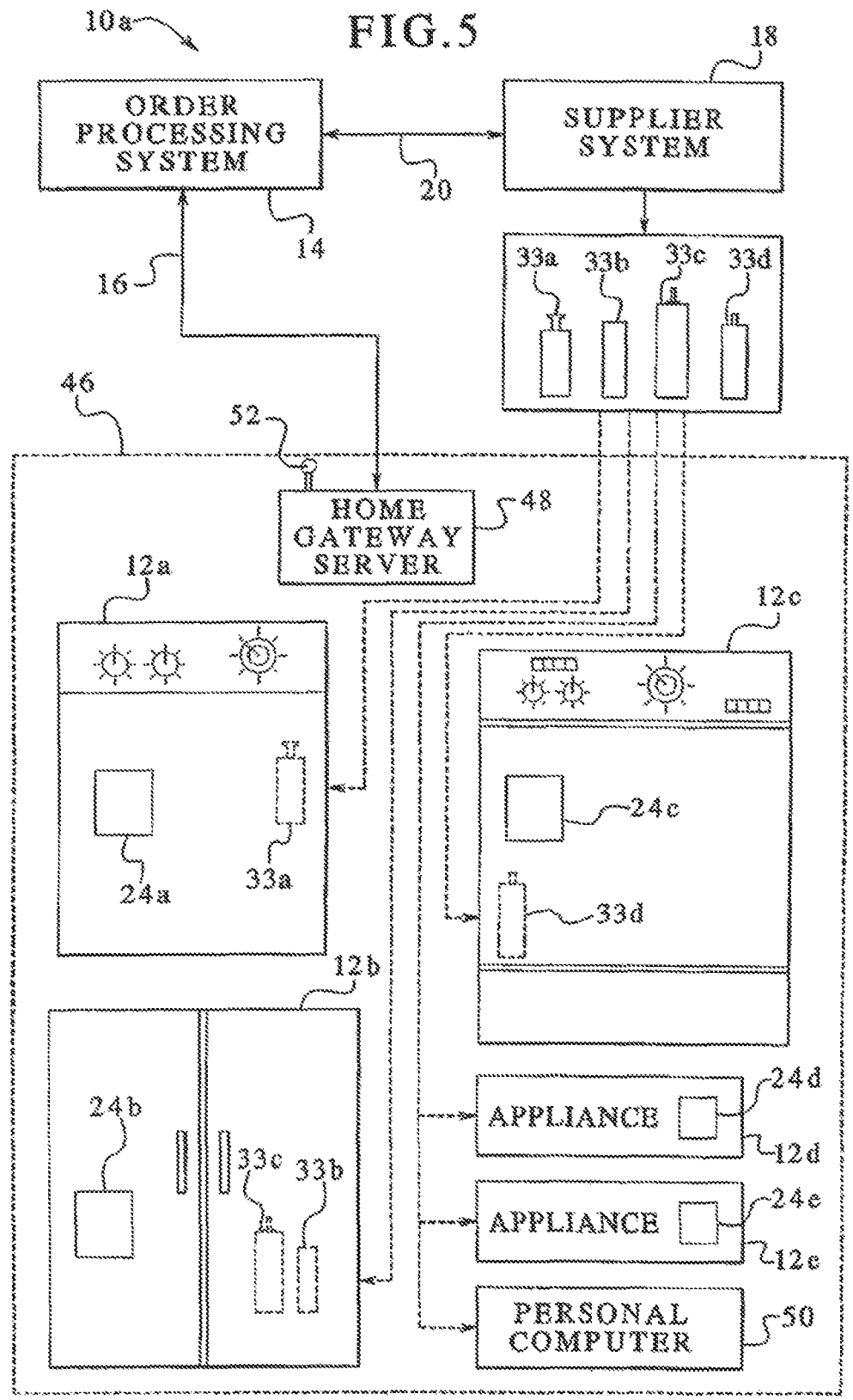

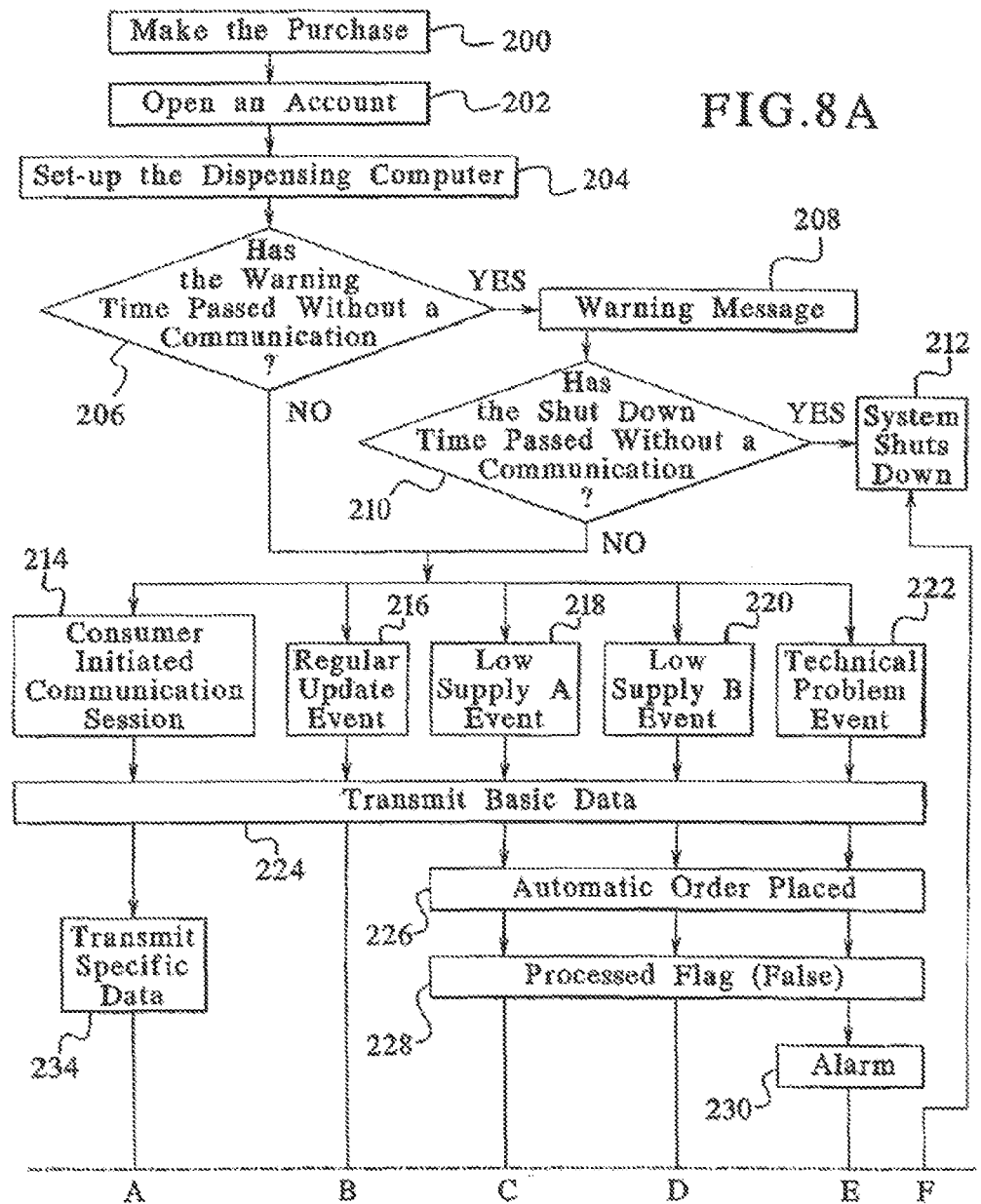

FIG. 9

| 300 Basic Data | 314 User Data | 316 Supplier Data | 312 Specific Data | | | 322 Supply Data | 324 Event Data | 326 Service Data |
|---|---|---|---|---|---|---|---|---|
| | | | 318 Dispensing Apparatus Data | 320 Dispensing Computer Setting Data | | | | |
| 302 Dispensing Apparatus Unit Identification | User ID | Supplier ID | Disp. Unit ID | Disp. Computer ID | | Supply ID | Event ID | Service ID |
| 304 Supply Identification | Supplier ID | Company Name | Unit Code | Disp. Computer Setting ID | | Supply Name | Date/Time Stamp | Service |
| 306 Supply Amount per Pump | Company Name | | Supply ID 1 | Disp. Computer Setting ID | | Supply Logo | Event Type: 1. Regular update, 2. Low supply A 3. Low supply B 4. Technical problem | |
| 308 Event Identification | Dispens. Unit ID | | Supply Level 1 | | | | | |
| 310 Usage Information | Last Name | | Supply ID 2 | | | | | |
| | First Name | | Supply Level 2 | | | | | |
| | Street | | Supply ID 3 | | | | Number of Supply A Containers | |
| | City | | Supply Level 3 | | | | | |
| | State | | Supply ID 4 | | | | | |
| | Zip Code | | Supply Level 4 | | | | Supply Authorization Code | |
| | Phone | | Supply ID 5 | | | | | |
| | | | Supply Level 5 | | | | Number of Supply B Containers | |
| | | | Supply ID 6 | | | | | |
| | | | Supply Level 6 | | | | Service ID | |
| | | | Disp. Computer Setting ID | | | | Processed Flag (True/False) | |

APPLIANCE HAVING A USER INTERFACE PANEL AND A BEVERAGE DISPENSER

PRIORITY CLAIM

This application is a continuation of, claims priority to and the benefit of U.S. patent application Ser. No. 12/817,680, filed on Jun. 17, 2010, which is a continuation of, claims priority to and the benefit of U.S. patent application Ser. No. 11/422,514, filed on Jun. 6, 2006, now U.S. Pat. No. 7,754,025, which is a continuation of, claims priority to and the benefit of U.S. patent application Ser. No. 10/930,306, filed on Aug. 31, 2004, now U.S. Pat. No. 7,204,259, which is a continuation of, claims priority to and the benefit of U.S. patent application Ser. No. 10/035,734, filed on Oct. 22, 2001, now U.S. Pat. No. 6,799,085, which is a continuation of, claims priority to and the benefit of U.S. patent application Ser. No. 09/790,349, filed on Feb. 21, 2001, which is a continuation-in-part of, claims priority to and the benefit of U.S. patent application Ser. No. 09/589,725, filed on Jun. 8, 2000, now U.S. Pat. No. 6,751,525, the entire contents of which are each incorporated herein by reference.

CROSS REFERENCES TO RELATED APPLICATIONS

This application is related to the following commonly owned co-pending patent applications: "Appliance with Dispenser," Ser. No. 12/766,439, and "Appliance with Dispenser," Ser. No. 12/845,331.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a system and method for distributing and dispensing or using appliance supplies or products, and in particular to a distribution and dispensing system which facilitates dispensing or using one or more supplies by an appliance, which tracks supply use, which automatically orders supplies as necessary, which facilitates the delivery of supplies to the users, which enables the users to determine supply usage, which enables users to change the supplies, and which reduces the need to store conventional supply containers.

BACKGROUND OF THE INVENTION

Many households in the United States and throughout the world use supplies or appliance supplies on a daily basis in connection with appliances such as refrigerators, washing machines, clothing dryers, dishwashing machines, water filters, furnaces and humidifiers. Typical appliance supplies include consumable products such as laundry detergents, dish washing detergents, fabric softeners, bleaches, drying sheets, beverages, food products and filters. To maintain an adequate supply of such appliance supplies, consumers must continuously supply their homes with various packaged products. This task can be relatively burdensome for families which experience a large consumption of such products or appliance supplies, in part because the appliance supply containers are often somewhat heavy and the appliance supply containers occupy substantial space in or near the appliances. Additionally, the cost in dollars and the time spent in purchasing such appliance supplies on an annual basis can be significant. Accordingly, there is a need for an appliance supply distribution and dispensing system.

SUMMARY OF THE INVENTION

The present invention provides an appliance supply distribution and dispensing system which solves the above problems by enabling users to obtain one or more supplies for an appliance, and which tracks, automatically orders and delivers or distributes the products or supplies used or dispensed by the appliances to the homes of the users of the present system. The appliance supply distribution and dispensing system of the present invention is referred to herein for brevity alternatively as the "system," "distribution system," "dispensing system" or the "appliance supply dispensing system." However, the scope of the present invention is not intended to be limited by such abbreviated terms or the use of any other abbreviated terms used herein to describe the present invention or components, steps or processes thereof.

Generally, the system of the present invention includes a plurality of appliance supply dispensing apparatuses housed in a plurality of appliances, at least one order processing system which communicates with the appliance supply dispensing apparatuses through a suitable communication channel and one or more supplier systems which communicate with the order processing system through a suitable communication channel. For purposes of this application, the present invention in part will be described in relation to one appliance supply dispensing apparatus, one ordering processing system and one supplier system. It should be appreciated that the system of the present invention includes a plurality of dispensing apparatuses in the appliances of multiple users, a plurality of order processing systems and a plurality of supplier systems which are preferably, but not necessarily, located in the geographic vicinity of the users to facilitate rapid and less expensive delivery of the ordered appliance supply containers to users of the system. Delivery by local suppliers or distributors will also conform to current business agreements between certain distributors and suppliers.

The appliance supply dispensing apparatus in the appliance is adapted to dispense or use at least one, and depending on the appliance, a plurality of appliance supplies pre-selected by the user. The appliance supply dispensing apparatus preferably includes an appliance supply dispensing or use computer, processor or appliance computer, a user interface panel or terminal (if necessary) connected to the dispensing processor, a dispenser or appliance supply mixing mechanism (if necessary) connected to the appliance supply dispensing processor, and one or more appliance supply mechanisms or apparatuses connected to the dispenser. The appliance supply mechanism preferably includes one or more housings for storing one or more appliance supply containers or the supply itself, and one or more actuators such as pumps or other suitable mechanisms (if necessary) for drawing or otherwise directing the appliance supply from the appliance supply containers or housing. The system of the present invention may be implemented in any appliance which dispenses or uses a consumable product or supply such as a consumable packageable product or supply.

One example of an appliance which may be used in conjunction with the present invention is a washing machine. The washing machine includes a detergent supply mechanism. The detergent supply mechanism includes a housing for storing detergent and preferably one or more detergent supply containers or canisters and a suitable mechanism for releasing the detergent supply from the detergent supply container or housing. The washing machine preferably includes one user readily accessible housing adapted to hold the detergent supply containers. This enables the user to easily change the detergent supply containers. The detergent supply containers are also preferably suitably sized to fit within the housing and are suitably sized for shipment via conventional delivery services.

The detergent dispensing apparatus in the washing machine dispenses the detergent as necessary for each wash or washing cycle. The supply dispensing computer in the washing machine preferably tracks (by timing, number of washes or dispenses or other suitable tracking events) the volume of detergent supply dispensed by the dispenser from each detergent supply container. When the supply levels decrease below a predetermined level (i.e., preferably within three days of depletion based on normal or average usage), the dispensing computer automatically sends an order for one or more new detergent supply containers to the order processing system. When the new detergent supply containers are delivered to the consumer's home, the consumer replaces the used detergent supply containers with the new detergent supply containers, preferably when the dispensing computer and interface inform the user that the detergent supply or supply is empty. It should be appreciated that the present invention contemplates any suitable supply level indicator such as a light, to inform the user to replace the supply container.

It should also be appreciated that the washing machine (or any appliance in accordance with the present invention) could include multiple dispensing mechanisms (and one or more indicators) for different supplies or products such as different detergents or different types of products (i.e., detergents, bleaches and fabric softeners). The dispensing computer or appliance computer could monitor all of these products or appliance supplies and make the appropriate orders as necessary.

In another example, the system of the present invention may be implemented in a refrigerator where appliance supplies are preferably mixed or combined to form a final product such as a ready to drink beverage. The refrigerator includes a $CO_2$ gas supply mechanism, a drink supply mechanism and a water supply mechanism connected to a dispenser. The $CO_2$ supply mechanism includes a housing for storing one or more $CO_2$ supply containers or canisters and a suitable mechanism for releasing the $CO_2$ gas from the $CO_2$ supply containers. The drink supply mechanism includes a housing for storing one or more drink supply containers or canisters and a suitable mechanism for releasing the drink supply from the drink supply containers. One or more readily accessible housings could be adapted to hold both the drink supply containers and $CO_2$ supply containers. This enables the user to easily change the drink supply containers and $CO_2$ supply containers. The drink supply containers and $CO_2$ supply containers are also preferably suitably sized to fit within the housing and are suitably sized for shipment via conventional delivery services.

The beverage dispensing apparatus in the refrigerator forms the beverages from the water supply, drink supply, and if the drink is carbonated, the $CO_2$ gas supply. The supply dispensing computer in the refrigerator preferably tracks (by timing) the volume of drink supply dispensed by the dispenser from each drink supply container. The dispensing computer may additionally track (by timing) the volume of $CO_2$ gas dispensed from each $CO_2$ supply container. When supply levels decrease below a predetermined level (i.e., preferably within three days of depletion based on normal or average usage), the dispensing computer automatically sends an order for one or more new drink supply containers (and possibly one or more new $CO_2$ supply containers) to the order processing system. When the new drink and $CO_2$ supply containers are delivered to the consumer's home, the consumer replaces the used drink supply containers with the new drink supply containers and replaces the used $CO_2$ supply containers with the new $CO_2$ supply containers, preferably when the dispensing computer and interface (or other supply level indicator) inform the user that the drink supply or $CO_2$ supply is empty.

The appliance's dispensing computer or appliance computer and user interface panel or terminal preferably coact to enable the user to register as a user with the order processing system, order additional supplies as desired, and to change the supplies dispensed by the appliance. For instance, if the user wants to try a new supply or product, the user enters such an order through the user interface panel. Furthermore, if the appliance or part thereof such as the dispensing apparatus breaks down or has any mechanical or technical problems, the system can be adapted to automatically order repair services, which causes a repair service to contact the user, determine an acceptable repair date and to repair the appliance on the repair date.

In one embodiment of the present invention, the dispensing computer or appliance computer directly communicates with the order processing systems through communication channels such as existing telephone lines, cable lines, wireless communications or the internet. In a preferred embodiment of the present invention, the dispensing or appliance computer communicates with a home area or home gateway network in the home of the user which facilitates communication between home appliances, audio and visual equipment, and computing devices. Such home gateway networks enable users to monitor and control all of the electronic equipment in their homes. The home gateway network in turn communicates over a suitable communication channel with the order processing systems. It should be appreciated that all of the appliances in a home or business may use the same or different ordering processing systems to order various types of supplies or products.

After an appliance having the dispensing apparatus of the present invention is installed in a user's home or other location and the dispensing or appliance computer establishes communication with the appropriate order processing system indirectly through the home gateway network or directly through another suitable communication channel, the user uses the user interface panel to select one or more supplies. The system automatically orders appropriate supplies (if the appliance is purchased without such supplies). Preferably within three days, the supply system delivers the ordered supplies to the user and the user installs the supply containers in the appliance supply dispensing apparatus to begin to dispense the supply or products. The dispensing computer monitors the level of supply and orders more supply when the supply reaches certain predetermined levels.

The appropriate order processing system receives and processes orders from a plurality of dispensing or appliance computers and transmits the orders to the appropriate supplier systems which are designated to serve the users. The order processing system generally includes a server or processor for receiving and processing the orders from the dispensing computers and for sending the orders to the supply systems, a data storage device for storing historic order and consumption information as well as appliance supply and other information, access terminals and input/output devices.

The supplier system receives orders from the order processing system for particular users (preferably in a predetermined geographic region) and facilitates the delivery of supplies to such users of the system of the present invention. The supplier system generally includes a server or processor for receiving the selected orders from the order processing system and for facilitating order fulfillment, access terminals and input/output devices. The supplier system also facilitates or provides a deliverer for delivering the supply containers to the user and provides for repair services for the appliances. Any suitable deliverer may deliver the supply container to the user; however, preferably the appliance supplies are delivered by a common carrier such as the postal service, United Parcel Service, Federal Express, etc. It should be appreciated that while the appliance supply containers or canisters could be of any suitable size, in the preferred embodiments of the present invention, they are suitably sized for such commercial shipment and to fit in the appropriate housing in the appliance.

The system of the present invention enables a user or consumer to sample a plurality of various supplies which the user may not ordinarily have the ability to sample or obtain. For a variety of reasons, many supply products are unavailable to consumers in many parts of the United States and in many parts of the world. The system provides an interface through which the user can select any supply which is supplied by the implementor of the system. The present invention makes a plurality of supplies available to the user including supplies not generally available in the user's geographic area. The present invention thus provides a direct appliance supply distribution system to the user of the system as well as an appliance supply sampling system which enables users of the system to sample products on a regular basis including products or appliance supplies the user would not normally be exposed to.

It should also be appreciated that the present invention prevents waste of supplies and supply containers. The dispensing apparatus enables the user to dispense the exact amount of supply which the user desires and enables the user to easily obtain more supply if desired. The present invention thereby eliminates much of the waste of unfinished supply containers such as carbonated beverages that tend to lose their carbonation or go "flat" after the container is opened.

Accordingly, the appliance supply distribution and dispensing system of the present invention: (a) employs an appliance to facilitate dispensing or use of one or more supplies selected by the user; (b) tracks the supply usage; (c) automatically orders additional supplies as necessary; (d) enables the users to monitor appliance supply consumption; (e) enables the user to select the appliance supplies from a large number of available supplies and to sample a wide variety of supplies; (f) enables the user to change the supplies dispensed; (g) facilitates direct delivery of supply or supply containers to the user; (h) orders repairs as necessary; (i) notifies users of new supplies available through the system; (j) reduces the need to store conventional supply containers; (k) reduces supply waste; (l) reduces waste of containers and container materials by providing the same amount of supplies in smaller and fewer containers; and (m) reduces the need for homeowners, consumers, customers and other users of the system (referred to herein as "users") to purchase for their homes containers of numerous different types of supplies such as detergents, dishwashing liquids and beverages.

It is therefore an advantage of the present invention to provide an appliance supply distribution and dispensing system.

A further advantage of the present invention is to provide an appliance supply distribution and dispensing system which dispenses or uses one or more supplies in an appliance.

Another advantage of the present invention is to provide an appliance supply distribution and dispensing system which automatically reorders supplies.

Yet another advantage of the present invention is to provide an appliance supply distribution and dispensing system which enables users to determine supply use, order additional supplies and to change supplies used by appliances.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 1 is a schematic diagram of one embodiment of the system of the present invention;

FIGS. 2A through 2E are schematic diagrams of alternative embodiments of the system of the present invention;

FIGS. 4A to 4J are illustrations of interfaces accessible to the user in an example of one embodiment of the present invention;

FIG. 5 is an schematic diagram of an example of a multi-appliance embodiment of the present invention;

FIGS. 8, 8A and 8B are flow diagrams of the operation of one embodiment of the system of the present invention;

FIG. 9 is a table illustrating data transmitted to and from the server and data stored on the server of one embodiment of the present invention;

DETAILED DESCRIPTION OF THE INVENTION

Figure 2A:
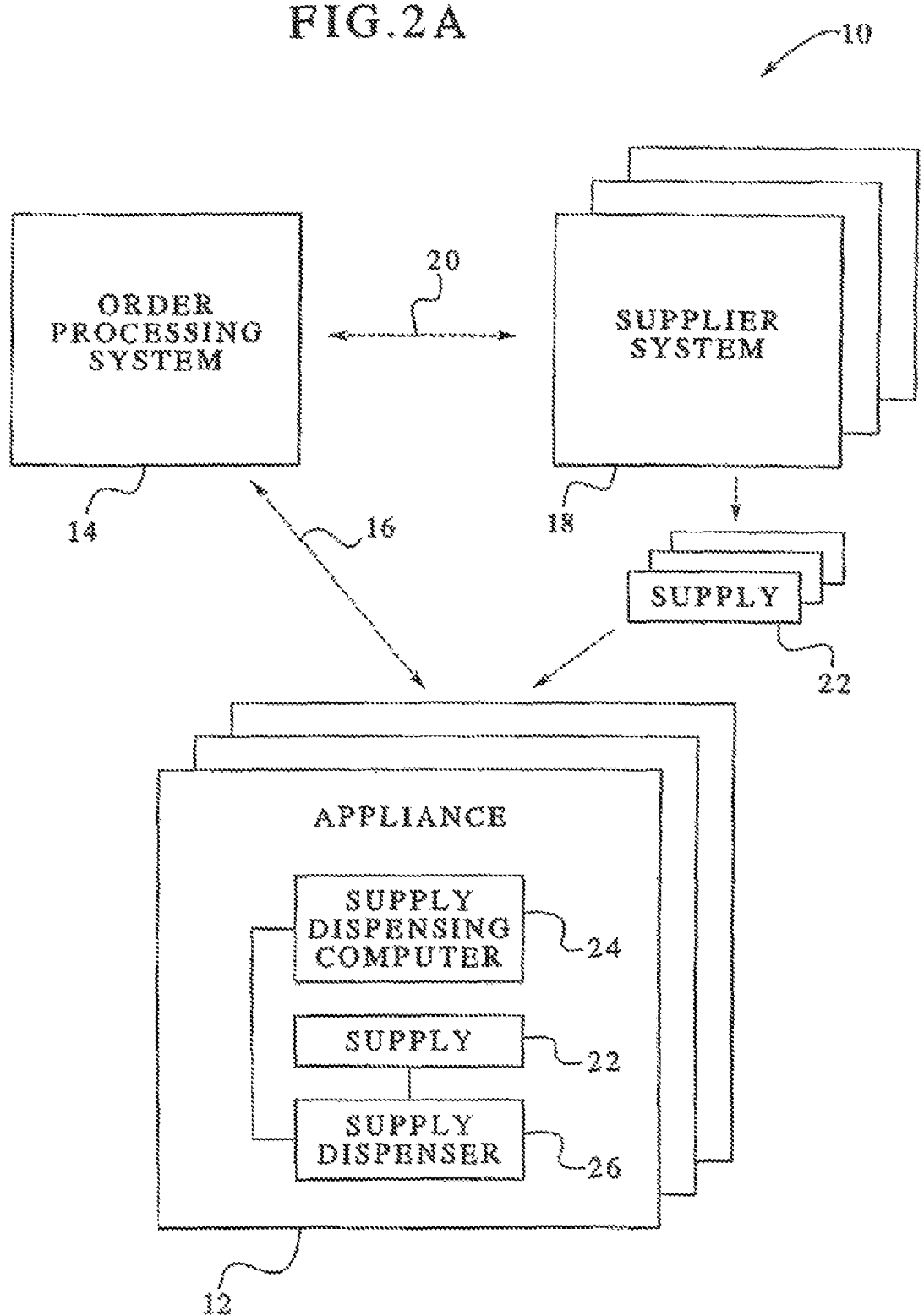

Referring now to the drawings and in particular to FIG. 1, one embodiment of the appliance supply distribution and dispensing system of the present invention, generally indicated by numeral 10, includes one or more appliances 12 which communicate with one or more order processing systems 14 through a dispenser communication channel 16. The order processing system(s) 14 communicate with one or more supplier systems 18 through a suitable communication channel 20. The supplier system(s) 18 provide one or more supplies 22 to the user of the appliance(s) 12 in response to an order. Each appliance 12 which is installed with a supply 22 preferably includes an appliance computer or supply dispensing computer 24, supply 22 and a supply dispenser 26. The supply dispensing computer may be adapted communicate with either or both the supply 22 or supply dispenser 26.

A user inserts supply 22 into a supply housing (not shown) within, or connected to or associated with the appliance 12. The appliance 12 is adapted to use the supply 22 for purposes such as washing items, rinsing items or producing beverages. Preferably, the appliance 12 includes a supply dispenser 26 for dispensing supply 22. However, it should be appreciated that certain supplies, such as water treatment supplies, filters and batteries are used but not necessarily dispensed when used. These types of supplies 22 are used directly within their supply housings (not shown). As a user consumes or uses supply 22, the appliance or dispenser computer 24 preferably tracks the decreasing amount of supply 22.

When the supply 22 reaches a predetermined depletion level or if a user makes an input or request, the appliance or dispensing computer 24 transmits a supply order to the order processing system 14. The order processing system 14 processes the order, and if acceptable, transmits the order along communication channel 20 to the supplier system 18. The supplier system 18 then delivers supply 22 to the appliance 12.

It should be appreciated that the system 10 can also deliver services to the appliance in response to a service order transmitted by the appliance or dispensing computer.

Figure 2B:
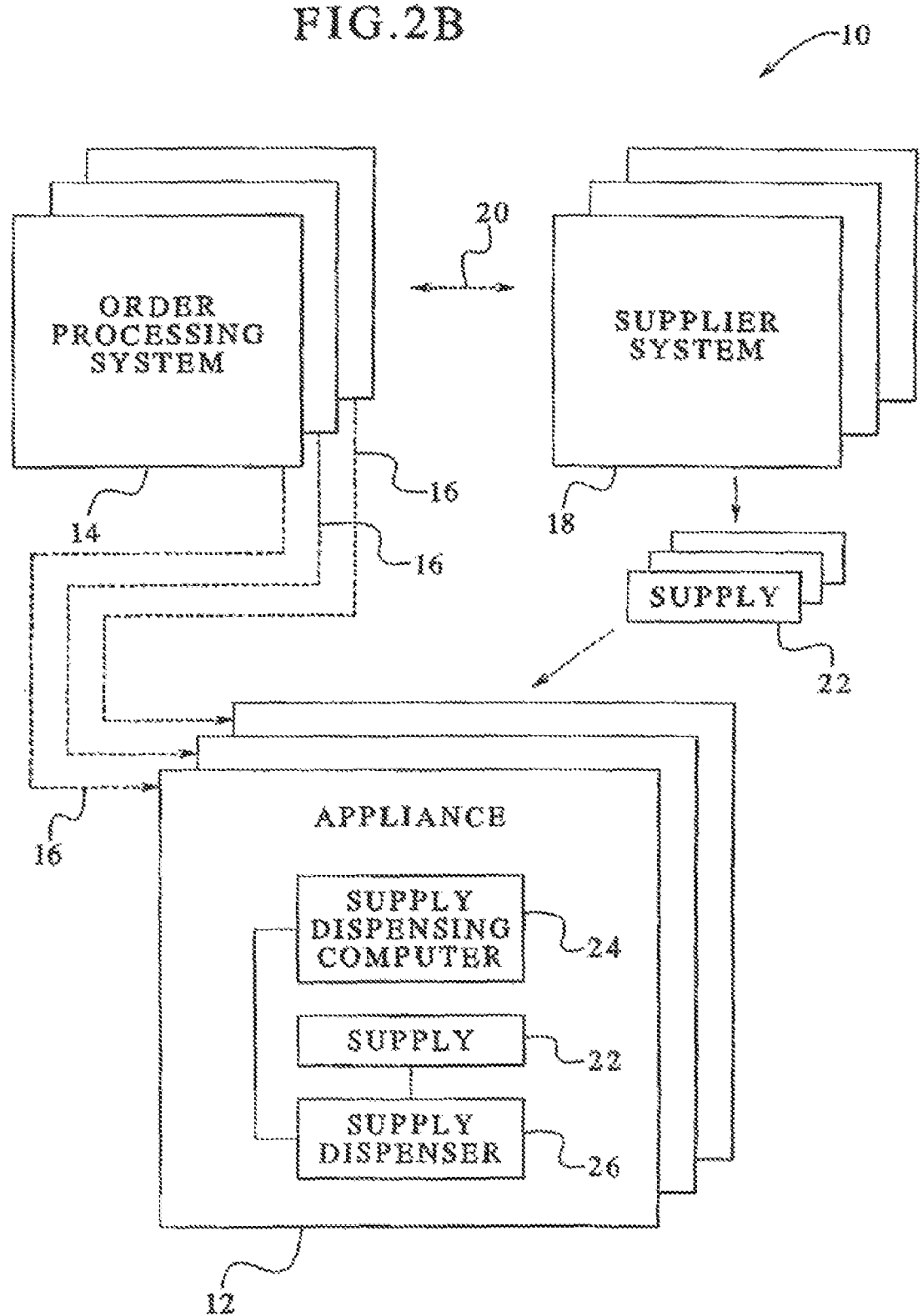
Figure 2C:
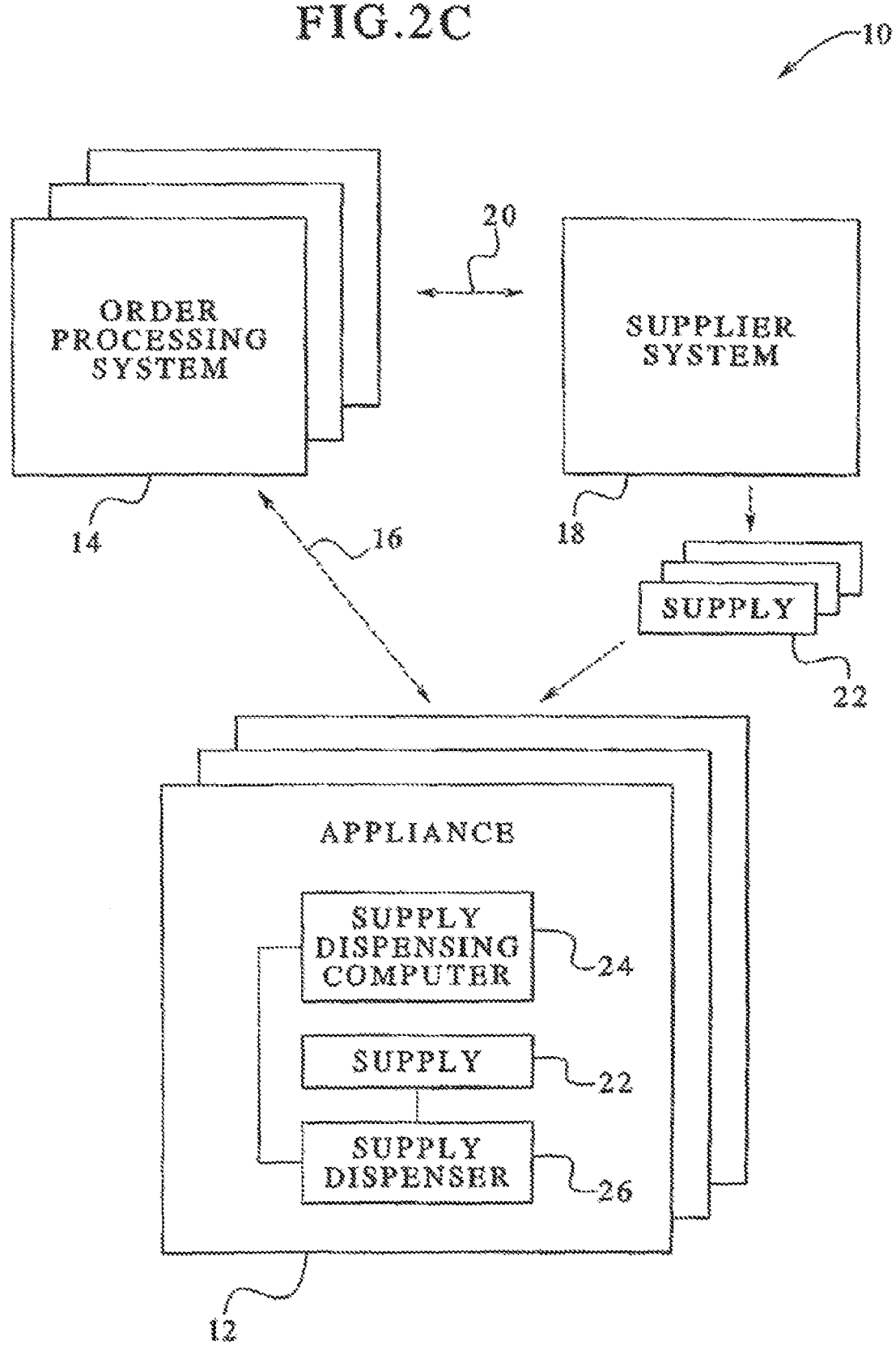
Figure 2D:
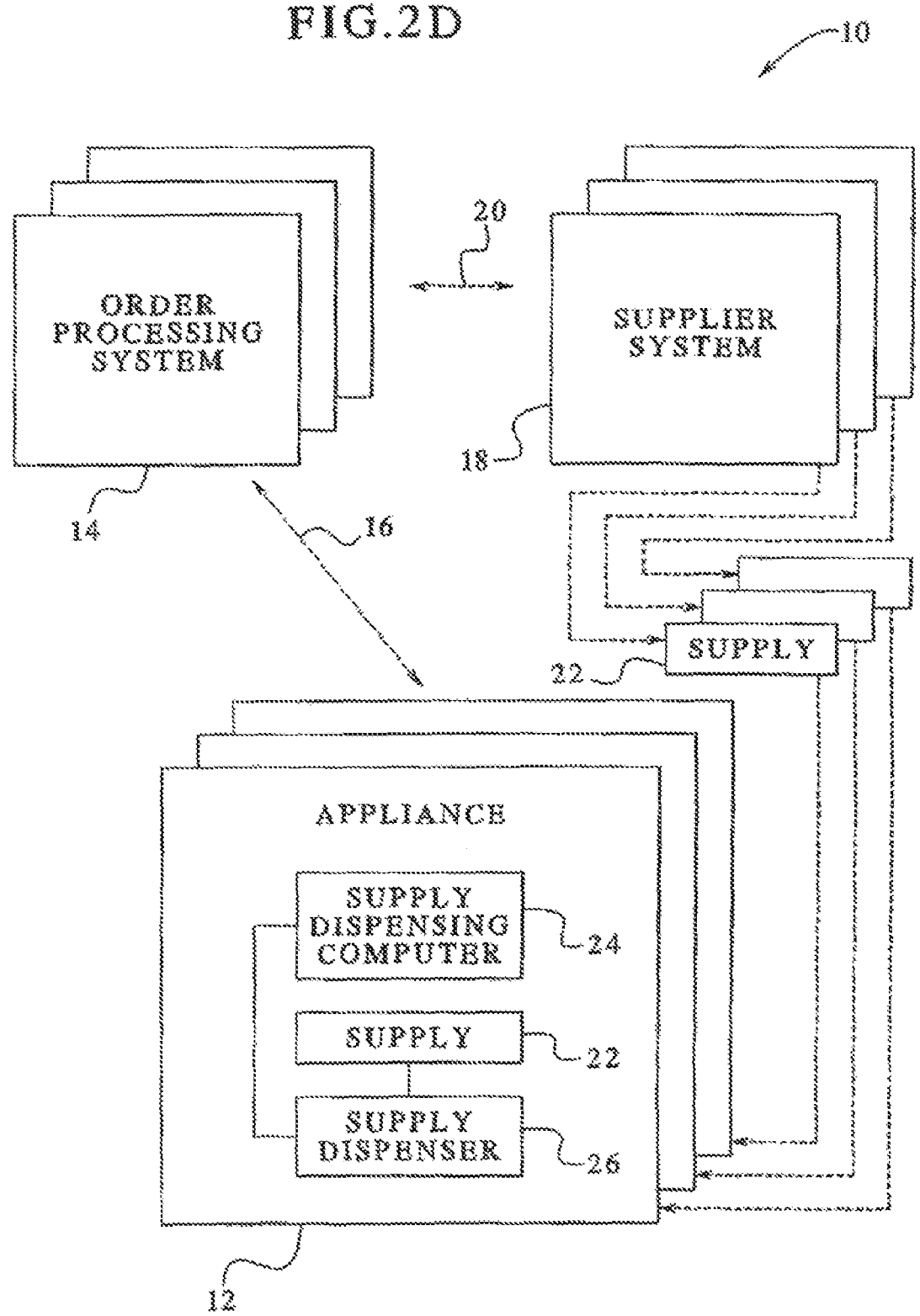

It should also be appreciated that the system can include various combinations of appliances 12, order processing systems 14 and supplier systems 18 for various scenarios. For example, a single order processing system 14 could serve various types of appliances 12 or supplies 22 as illustrated in FIG. 2A. Alternatively, the system 10 could include a single order processing system 14 for each type of appliance 12 or supply 22 as illustrated in FIG. 2B. Similarly, a single supplier system 18 could serve various types of appliances 12 and supplies 22 as illustrated in FIG. 2C. Alternatively, the system 10 could include a single supplier system 18 for each type of appliance 12 or supply 22, as illustrated in FIG. 2D. Also, as illustrated in FIG. 2E, different order processing systems 14 and supplier systems 18 can serve a single appliance 12 which has needs for different types of supplies 22.

It should be appreciated that the dispenser communication channel 16 and supply communication channel 20 could be the same communication channel or the same data network such as the internet, as discussed below.

Appliance

Figure 3:
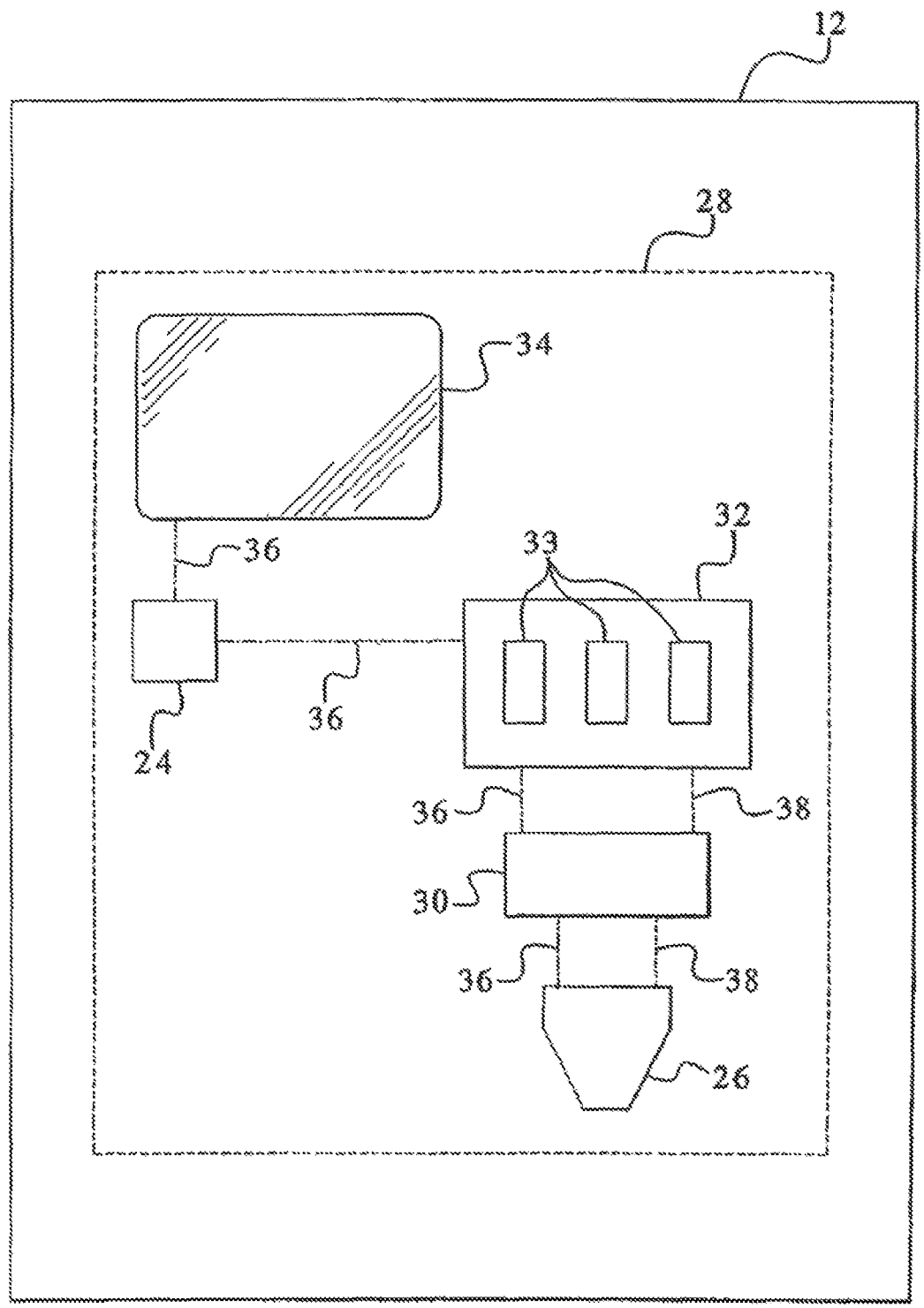
FIG. 3 is a schematic diagram of one appliance embodiment of the present invention.

As illustrated in FIG. 3, in one embodiment of the present invention, the appliance 12 includes an appliance supply dispensing apparatus 28 and standard mechanisms for such an appliance and is specifically constructed, structurally and electrically, to house and accommodate the supply dispensing apparatus 28. The supply dispensing apparatus 28 preferably includes: (i) a supply dispensing computer or processor 24; (ii) a user interface panel or terminal 34; (iii) a dispensing mechanism 30; (iv) a supply mechanism, apparatus or dispenser 26; (v) a housing 32 for storing supply or one or more supply containers 33; (vi) a plurality of electrical communication lines 36; and (vii) one or more supply fluid communication lines 38. These components are preferably mounted at suitable places in appliance; however, it should be appreciated that one or more of these components could be mounted in a housing adjacent to the appliance in accordance with the present invention.

Dispensing Computer

The dispensing computer, appliance computer or processor 24 of the present invention, as described in more detail below, monitors all dispensing or depletion of supplies, the amount of supply remaining, the supplies ordered, the total supply use or consumption for each type of supply and all inputs or changes to the system or appliance supply requested by the user.

In one embodiment of the system of the present invention, the appliance supply dispensing processor 24 communicates directly with the server in the order processing system 14 via a dial-up connection or modem. In another embodiment of the present invention, the appliance supply dispensing processor 24 communicates indirectly with the server in the order processing system via a dial-up connection to an internet access provider which enables connectivity to the server. In a further embodiment of the present invention, the supply dispensing processor 24 communicates indirectly with the server in the order processing system via a home gateway server using a direct dial-up connection. In a still further embodiment of the present invention, the appliance supply dispensing processor 24 communicates indirectly with the server in the order processing system via a home gateway server using an indirect dial-up connection to an internet access provider which enables connectivity to the server. In a still further embodiment of the present invention, the appliance supply dispensing processor 24 communicates indirectly with the server in the order processing system via a home gateway server using an indirect Ethernet home network internet connection with enables connectivity to the central server. As further discussed below, in any of these embodiments, the supply dispensing processor 24 automatically communicates orders generated by the supply dispensing processor 24, user registration information, user orders generated by the user, repair orders and user consumption and use information to the order processing system 14.

User Interfaces

In one embodiment of the present invention, the system communicates with the user through the user interface panel or terminal 34 which is preferably a conventional touch screen adapted to display a plurality of interfaces. Alternatively, other user interfaces such as selections, buttons, lights, indicators, or other suitable mechanical or electronic devices may be used in conjunction with the present invention. The user can use the interface or interface panel 34 or other devices to cause the appliance to use a supply or product. It should also be appreciated that the appliance could automatically dispense or use a supply or product, such as dispensing one type of washing detergent (from a plurality of different detergents) when different washing cycles are used. For energy saving purposes, the user interface panel 34 or the supply dispensing apparatus 12 preferably includes a motion detector or sensor (not shown) in the appliance. The motion sensor detects when a user approaches the appliance and causes the user panel to illuminate the touch screen when the user approaches the appliance.

The user panel is adapted to display a plurality of interfaces to the user as illustrated in FIGS. 4A through 4J. The initial interface includes one or more products or selections. However, it should be appreciated that the number of selections may vary in accordance with the present invention. In the example base or primary interface 40a illustrated in FIG. 4A and displayed by the user interface panel 34, the selections 42 include SUPPLY A-2, SUPPLY B-1, SUPPLY C-2, SUPPLY D-3, SUPPLY E-2 and SUPPLY F-6. The user may touch any of these selections 42 to dispense a supply or to cause the appliance to dispense a supply. It should also be appreciated that in one embodiment of the present invention, only one selection 42 may be available such as one type of dishwashing soap in a dishwasher.

This primary interface 40a also includes several other commands including a back or return command 44a which causes the user panel to display a previous interface, a forward command 44*b* which causes the user panel to display the next interface, a change brands command 44*c* which causes the user interface panel 34 to display the interfaces which enable the user to order different brands of supply and to physically change supply, a question command 44*d* which causes the user interface panel 34 to display interface contact information for the user including who to contact if the user has questions, a home command 44*e* which causes the user interface panel 34 to display an interface which provides information regarding the use or consumption of supply through the system in the user's appliance and an information command 44*f* which causes the user interface panel 34 to display interfaces which enable the user to find out more information regarding supply available through the system. Commands 44*a* to 44*f* are preferably accessible from every user interface, as illustrated in FIGS. 4A through 4J, to enable the user to navigate through the system and perform the functions provided by the system. It should be appreciated that additional functions or options could be added to the system and to the interfaces.

For instance, although not shown, the present invention contemplates providing the user an interface which enables the user to order extra supplies. The interface preferably enables the user to select the supply and input the date of an event and the other information about the event. The system could be adapted to assist the user in determining the necessary volumes of supply based on standard volume calculations. The system preferably also ensures that the user receives the necessary supplies by sending a message to the user which is displayed on the panel a predetermined number of days before the event. The predetermined number of days would preferably enable the system enough time to send another order if necessary. It should be appreciated that the order processing system preferably includes a message screen with an O.K. indicator or other feature which is adapted to display other messages, information and advertisements for the user, sent over the dispenser communication channel to the dispensing computer, which the dispensing computer will display at designated times. It should also be appreciated, as discussed below, that the dispensing computer and the panel will provide the user with an interface for registration with the order processing system and may include a touch screen keyboard for enabling the user to type messages and send the messages to an administrator of the order processing system.

As illustrated in FIG. 4B, if the user presses the change brands command 44*c*, the dispensing computer displays a change brands interface 40*b*. The change brands interface 40*b* identifies or lists a plurality of types of supplies which the user can choose from through the system 10. These are generally categorized into appropriate categories. However, it should be appreciated that any type of supply or product may be added to the list if the system dispenses that type of supply or product. When the user touches one of the supplies, the user panel displays a selection interface 40*c* as illustrated in FIG. 4C. The selection interface 40*c* shows the variety of product or brand selections 42*b* in the selected category. For instance, the interface illustrates six brands of supplies which the user can select through the system. If all of the selections do not fit on one screen, additional selection interfaces can be provided and the user will use the backwards or forwards commands 44*a* and 44*b* to view all of the available supply selections.

After the user selects a product or supply brand which the user would like to obtain, the dispensing computer displays the replacement brand interface 40*d* as illustrated in FIG. 4D. The replacement brand interface 40*d* displays the user's current selection of supply brands. Specifically, the system uses this interface to ask the user which brand the user wants to replace. The user preferably selects one of the six primary selections 42*b* for replacement. It should be appreciated that the present invention contemplates having a different number of selections and suitable interfaces associated with such selections. After the user selects a brand to replace, the dispensing computer provides a replacement confirmation screen interface 40*e* as illustrated in FIG. 4E. This interface asks the user to confirm or cancel the order which replaces one type of product, in this case SUPPLY E-2, with another type of product, in this case SUPPLY C-3. If the user presses the OK button 44*g*, the dispensing computer sends the order to the order processing system. If the user presses the CANCEL command 44*h*, the dispensing computer does not send the order and preferably returns the user to the change brands interface 40*b*.

The dispensing computer replaces the new supply selection logo on the primary interface when the new supply is delivered to the user and the user inserts the new supply into the housing 32 in the appliance. A change brands interface (not shown) or an additional interface is provided to the user for the user to inform the dispensing computer that the user is changing or replacing a supply container. In one embodiment, this could include an authorization code. Alternatively, the dispensing apparatus could read a bar code or other label on the supply container that informs the dispensing computer of the change as further discussed below. Preferably, the interface provides a message screen which informs the user how to change the supply and specifically (if applicable) in which slot the old supply which needs to be replaced is located. Each slot preferably is numbered, lettered, has other indicia or has an alternative designation for identifying the slot to the user and distinguishing the slots. The interface may also provide a change canister command which the user presses when the user is going to change a supply container.

If the user presses the "I" or information command 44*f*, the user can obtain information about the user's use of the system though a consumption interface 40*f* illustrated in FIG. 4F. The dispensing computer tracks the average daily consumption or use history for each supply dispensed by the dispenser. For each supply, the system preferably displays the number of uses of the supply, the amount of each use, and the total volume of the dispensed supply. This system could also be used by the user to determine if too much of one supply and not enough of another supply is being consumed.

Figure 4G:
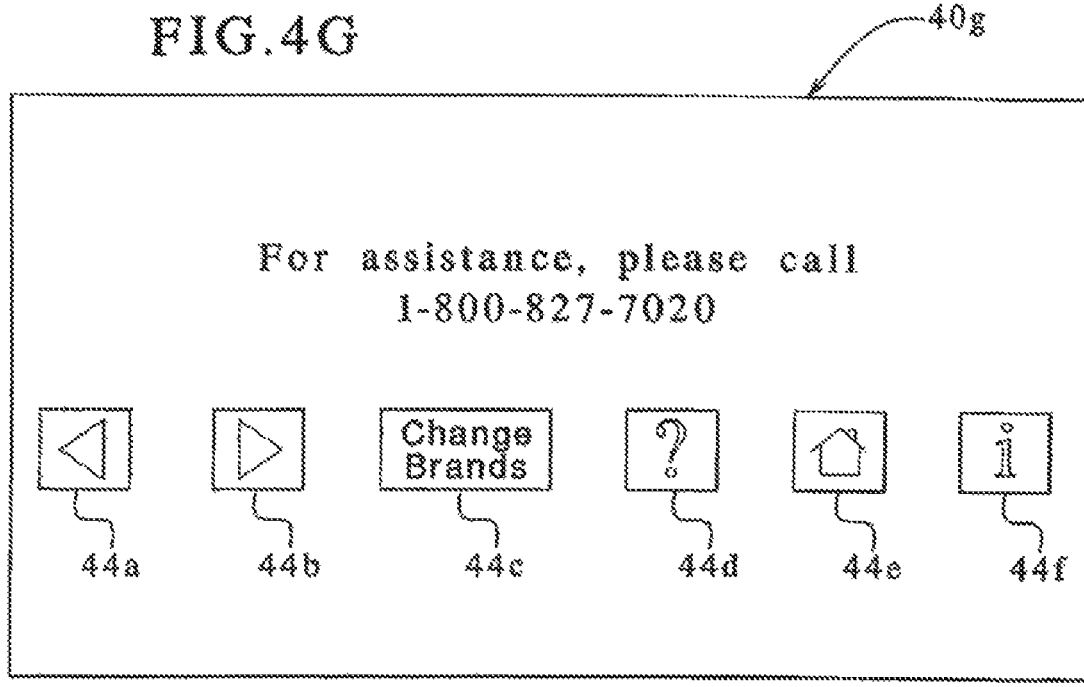
Figure 4H:
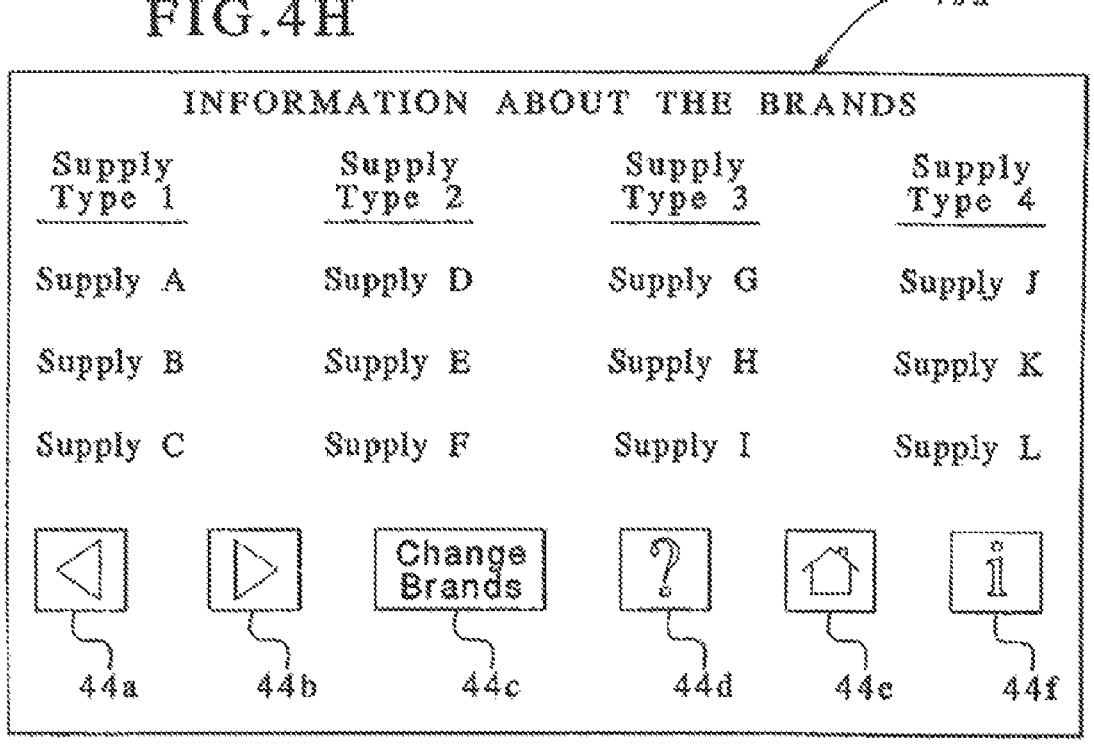

If the user presses the question mark command 44*d*, the dispensing computer displays a contact interface 40*g* which includes contact information such as a telephone number as illustrated in FIG. 4G which the user can use to contact the implementor of the order processing system or the supplier system.

Figure 4I:
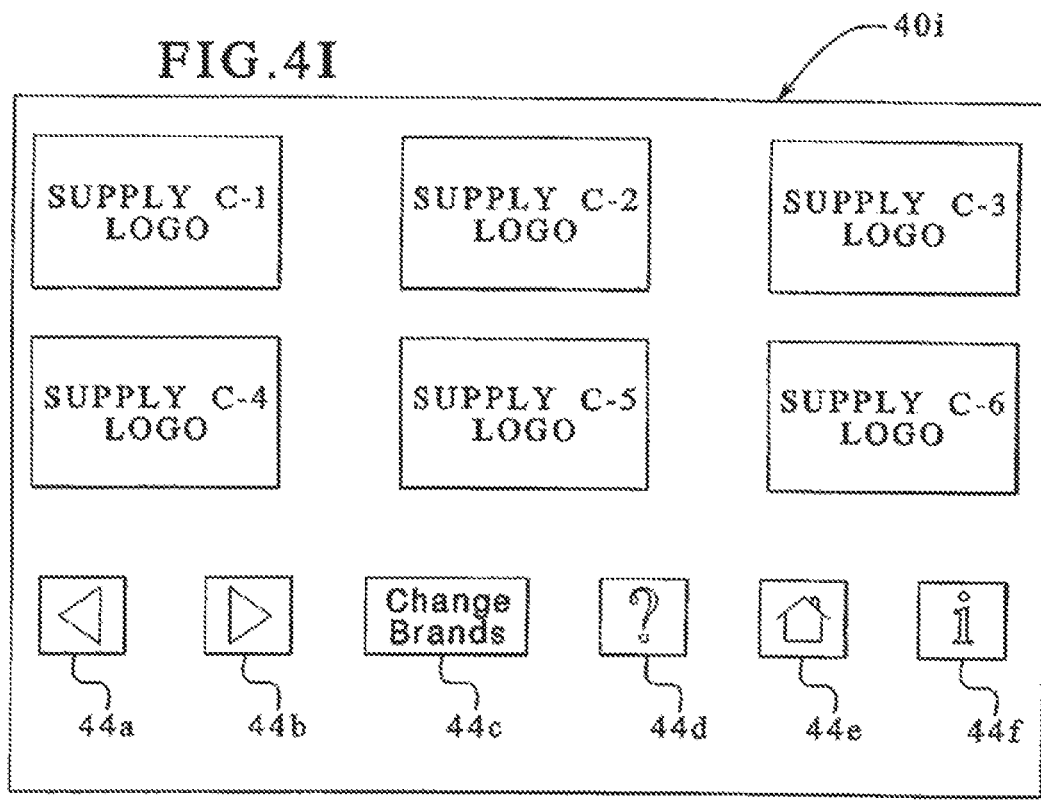

The user can also use the "I" or information command 40*f* to find out more information about certain products or supplies. By pressing the information command 40*f*, the user can obtain the information interface 40*h* which lists all of the different types of products or supplies available through the system. If the user wants to find out more information regarding a beverage, the user touches one of the types of supplies, and the system displays a supply selection interface 40*i* which lists supply and the logos for supply in the area as illustrated in FIG. 4I.

Figure 4J:
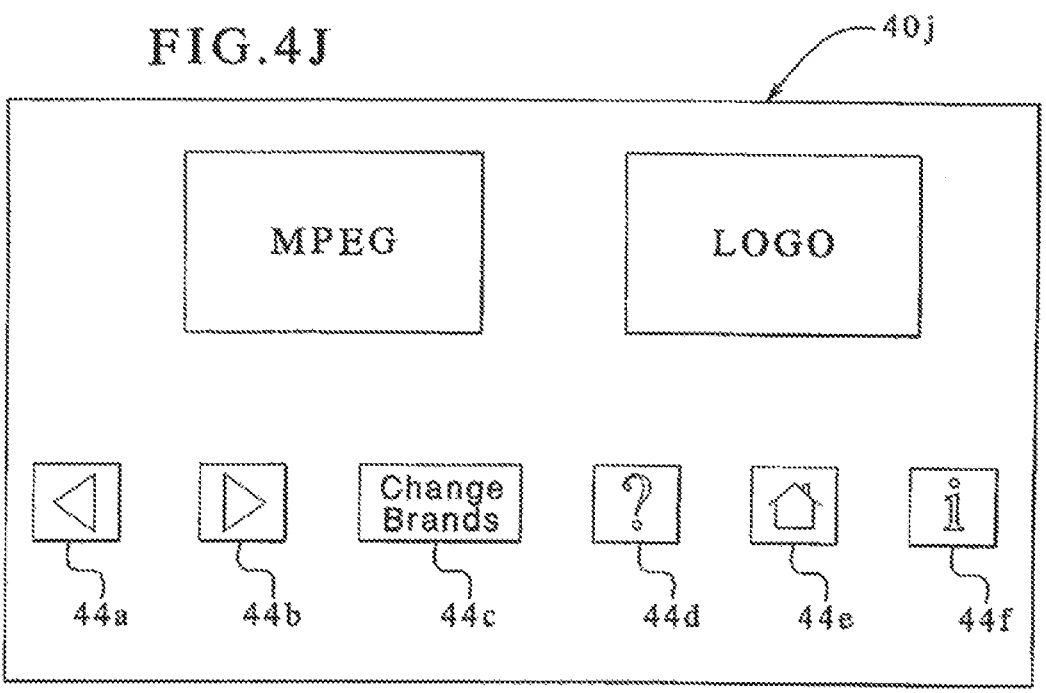

If the user wants to find out more information about a particular supply, the user can press the logo of the supply and the system will display an information interface 40*j* which includes a specific information screen regarding the selected supply as illustrated in FIG. 4J. In particular, this interface may include a logo and textual information or in a preferred embodiment of the invention, the interface would be able to display a visual JPEG file or an audiovisual MPEG file. The JPEG or MPEG files could be downloaded into the system during communication with the order processing system on a regular basis, or these files could be downloaded from the order processing system upon a request from the user. The JPEG or MPEG file will be able to display photographs or audiovisual works such as a commercial regarding the selected supply. The commercials or other information provided to the user could be selected on a national, regional, geographic or individual user basis. For instance, the system could provide information in Spanish to Spanish speaking users. Accordingly, the present invention is adapted to provide consumers with more information regarding brands of supplies and other information. The present invention also thus enables manufacturers to directly promote brands or supplies directly to the consumers or users of the system. Based on knowing the supply use in a home, the system could be adapted to provide information or free supply samples to consumers to influence their future purchasing. The system could also be used to provide information regarding other products or services to the user.

It should be appreciated that the system could be adapted to provide each individual in a household having the system with a separate user code which would enable the system to track individual use on consumption. The individual would enter this code each time the user used a supply, for instance, when obtaining a drink, washing clothes, washing dishes or using any appliances supported by the system.

It should also be appreciated that the user interface panel could serve other functions such as enabling the user to adjust temperatures or other conditions in an appliance.

It should further be appreciated that the user interface panel may provide the user with access to the internet, multimedia entertainment and other commercial information through the panel and suitable speakers installed in or on the appliance.

Communication Channels and the Home Network

With reference to FIG. 5, in one embodiment of the present invention the system 10a reaches a user's home 46, includes a home gateway server 48 for communicating to one or more appliances 12a through 12e. Each dispensing computer 24a through 24e in the home 46 and at least one personal computer 50 in the home 46 preferably will communicate with the home gateway server 48 via wireless communications 236 or via hardwire lines (not shown) in the home 16. The system thus preferably includes a local area network (LAN), and specifically a home area network (HAN) designed to network home appliances, audio and visual equipment, and computing devices. The dispensing computers use the network to transmit orders for supply containers 33a through 33d to the order processing system 14.

Because HAN is presently largely unavailable in homes and because common residential internet access is often slow and sometimes unreliable, the dispensing computer may communicate directly over the communication channel via a server dial-in, telephone line connection. Thus, if the home does not include a home gateway server, the dispensing computer would preferably include a modem (not shown) which enables the dispensing computer to exchange data or directly communicate with the order processing system 14 via communication channel 16. The modem would be electrically connected to telephone (not shown) which would provide access to dispensing communication channel 16. Preferably, the modem would be modular and replaceable so that dispensing computer can utilize alternative communication technology and dispensing communication modes as they become available in the home.

The dispensing communication channel 16 and supplier communication channel 20 are any suitable communication channels which enable dispensing computer and supplier system 18 respectively, to communicate with and transfer data to and from the order processing system 14. The dispensing communication channel 16 extends beyond the home, using a digital subscriber line (DSL), fiber optics, satellites, or high speed cables. The dispensing communication channel 16 could also be a transmission control protocol (TCP) Internet Protocol (IP) Internet connection or a cable or fiber optic connection.

All communications between the dispensing computer and order processing system 14, and between the order processing system 14 and the supply system 18 are preferably protected with suitable security measures, and preferably a proprietary protocol. The proprietary protocol may include any means for preventing unauthorized users from conducting a communication between dispensing computer and order processing system 14.

Dispensing Computer, Ordering Processing System and Supplier System

Figure 6:
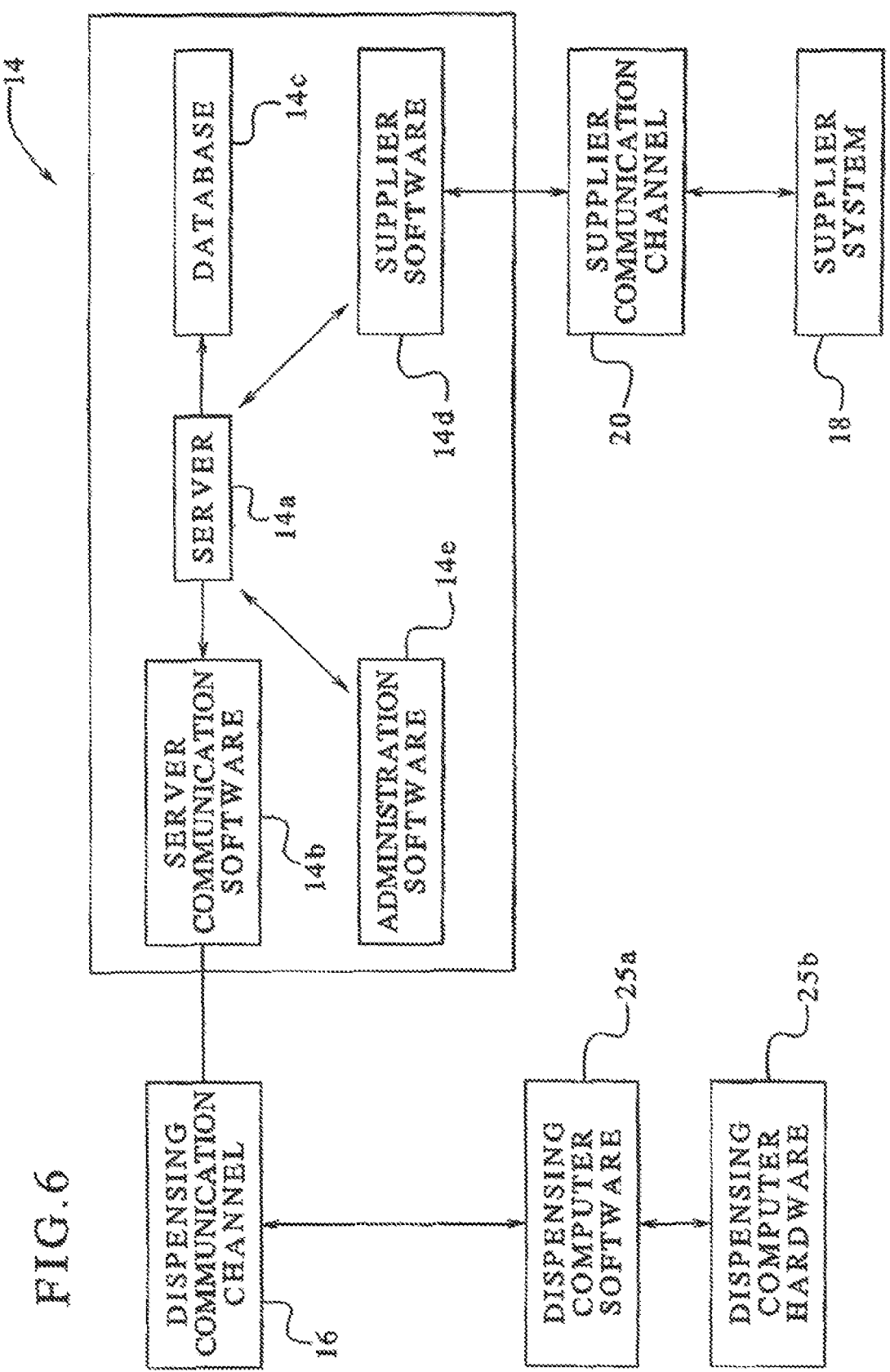
FIG. 6 is a schematic diagram of the dispensing computer, order processing system and supply system of one embodiment of the system of the present invention.

Referring now to FIGS. 5 and 6, the dispensing computer 24 preferably includes dispensing computer software 25a which is run on the dispensing computer hardware 25b to facilitate communication with the order processing system 14 over a dispensing communication channel 16.

The order processing system 14 includes a processor or server 14a, server communication software 14b for communicating with the dispensing computer 24, a relational database 14c connected to the server 18a, database software (not shown) for accessing and storing information on database 14c, supplier software 14d for communicating with the suppliers, administrative software 14e for handling the administrative functions of the order processing system, at least one and preferably a plurality of administrative terminals (not shown) and output devices (not shown) connected to the server over a computer network system such as an Ethernet system. Processor or server 14a may be any feasible server type although the preferred server type is Microsoft SQL Server. The relational database 14c is adapted to collect and store data regarding consumer usage and consumption of appliance supplies in geographic areas. The administrative computers and one or more output devices enable administrative computer operators to access the server, make any necessary changes and to generate reports regarding the users, consumption, use and orders. Order processing system 14 receives the orders from the dispensing computer, stores various categories of useful data related to users, supplies and services and sends orders to the appropriate suppliers as discussed below.

Administrative computer operators use administrative computers which are loaded with server administrative software 14e and supplier software 14d. Server administrative software 14e provides a graphical user interface which administrative computer operators use to access, use, format, manipulate and interact with the data available on database 14c. Preferably, administrative computer operators process orders and respond to user needs regarding low appliance supply events and technical problems. Administrative computer operators determine the particular products or services needed by a user, contact a supplier of such products or services and direct the supplier to supply such products or services. Administrative computer operators also generate various graphic and statistical reports, preferably general customer reports, customer invoices, consumption trend graphs, usage forecasts, postage, labels, and demographics, preferably appliance supply usage by zip code, area code, city, and state.

The suppliers may be the system implementor, or manufacturers, distributors or vendors of the appliance supply. As indicated above, the suppliers preferably, but not necessarily, are located or have a place of business near the users. Each supplier preferably has a supplier system 18 which communicates with the order processing system 14 through the supplier communication channel 20. The supplier system 18 includes a processor or server (not shown), server communication software (not shown) for communicating with the order processing system, at least one administrative terminal (not shown) connected to the server, and conventional output devices (not shown) for printing user supply and repair orders and related documentation. Preferably, the supplier system 18 includes a memory device or database for storing software or data.

The supplier system 18 obtains orders and obtains the relevant user data necessary to deliver the supplies or services to the users. Suppliers can deliver the appliance supply containers directly to the user. Alternatively, suppliers can use an independent contractor such as the United Parcel Service, Federal Express or the postal service to deliver the appliance supply containers to the user. In a further alternative embodiment, the supplier can be a local manufacturer or supplier or can supply local distributors with orders to process for delivery.

In the preferred embodiment of the present invention, the order processing system also preferably includes billing and payment software for facilitating billing users of the system and payments to the suppliers. In an alternative embodiment of the present invention, the supply system includes billing and payment software for facilitating billing users of the system and payments to the implementor of the order processing system.

During the operation of the distribution system 10 as discussed below, the levels of appliance supply decrease. Dispensing or appliance computer 24 monitors these supply levels, preferably by monitoring the time the dispenser dispenses each appliance supply at a known flow rate. When the levels decrease to a certain amount, dispensing or appliance computer 24 automatically transmits an order to order processing system 14. The dispensing or appliance computer 24 also monitors dispensing apparatus 28 for break downs or technical problems. If the dispensing apparatus 28 needs repair, dispensing computer 24 transmits an order to order processing system 14.

At regular intervals and preferably at least once per day, the supplier system 18 communicates with the order processing system 14 to check for any new orders. If there is a new order, the supplier system 18 obtains the order and arranges for supplies to be delivered to the user or for a repair visit as requested.

It should be appreciated that the order processing system will preferably be adapted to download updates to the dispensing software of the dispensing computer and updates to the supply software of the supply system. In one embodiment of the present invention, to allow for a larger number of users, the system uses telephone lines to communicate information. The gateway server is installed with a dial up modem that will enable it to communicate with the server in the order processing system. The communications systems are preferably modular to enable the modem to be supplemented with improved technology as it becomes available. The dispensing computer unit will communicate to the gateway server, at a minimum of once an hour. All communications to the server of the order processing system preferably take place late at night to lessen the chance of using the user's telecommunications lines when the user desires to use such lines.

Figure 7:
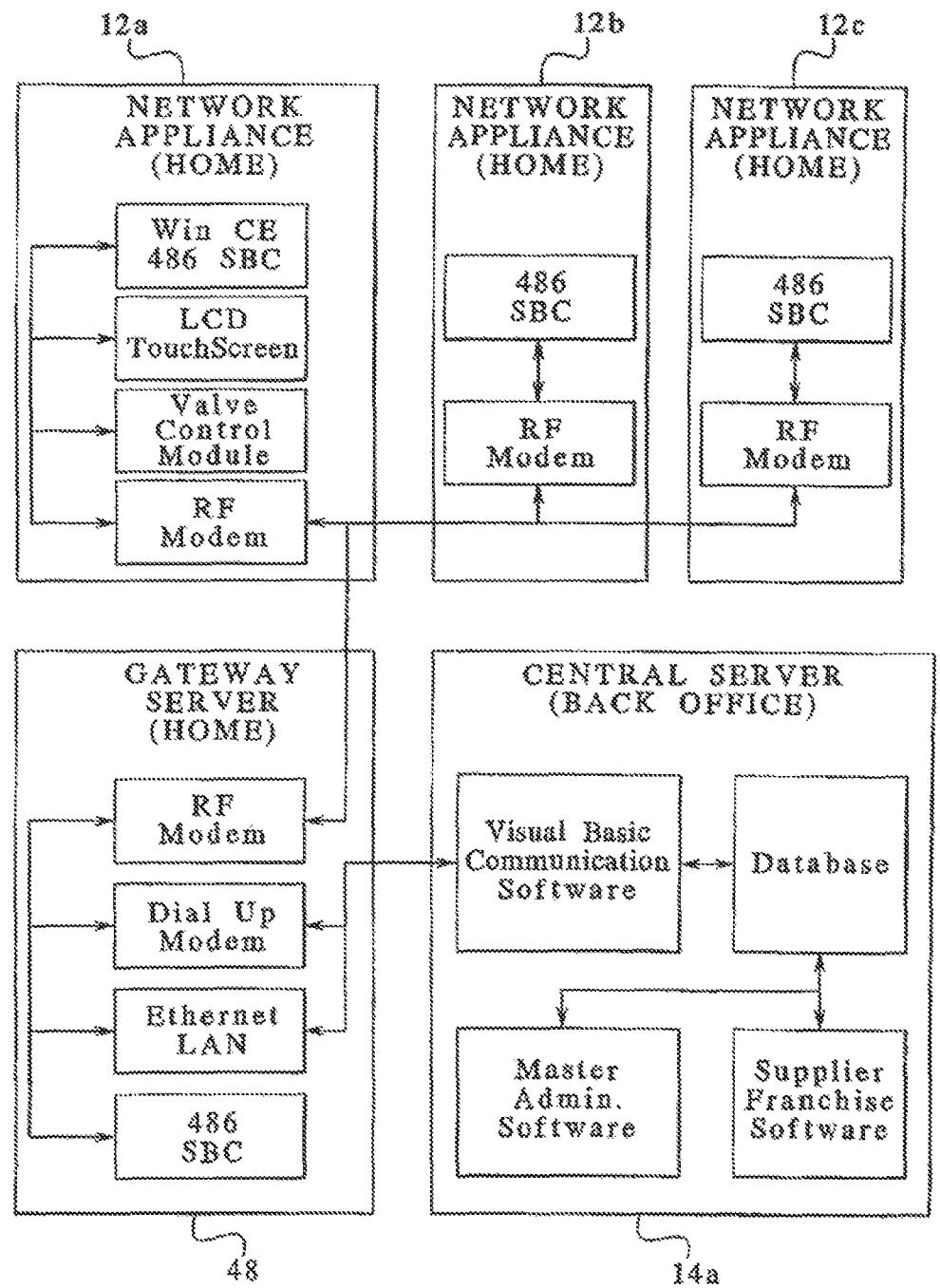
FIG. 7 is a more detailed schematic diagram of one preferred embodiment of the architecture of the computer and communication systems of the present invention.

In one embodiment of the present invention, the server 14a of the order processing system, as illustrated in FIG. 7 includes three main software applications including: (a) an application that is responsible for communications with the gateway server wherein calls placed by the gateway server are answered and control turned over to the database application once communications have been established; (b) a database application which stores the information provided by the gateway server to generate reports, trend graphs, usage forecasting, etc; and (c) a graphical user interface application for the server for making reports or accessing data with the database.

In this embodiment, the gateway server 48 preferably includes: (a) a gateway server application to initiate RF communications/polling with the dispensing computer; and (b) a gateway server application to initiate dial up communications with the server of the order processing system and upload information provided by the dispensing computer. In this embodiment, the dispensing computer is a 486 SBC with video and sound capability. The SBC has a provision for a Disk On Chip (DOC) flash disk, which will contain the Windows CE operating system. The dispensing computer communicates serially to two devices. The communications take place on COM 3 and COM 4 at 9600 baud, one start bit, one stop bit, no parity, and 8 data bits.

In one embodiment, the device connected to COM 3 is a valve control processor or VCP. The VCP is responsible for opening and closing valves (or solenoids) of the system under command of the CE-SBC. The VCP only speaks when spoken to by the CE-SBC. The VCP is also responsible for keeping usage totalizers for each of the supplies, supply canisters or containers. These totalizers are individually set or reset upon command of the CE-SBC. The CE-SBC and the VCP communicate using a comma delimited, fixed field length, ASCII packet structure.

The CE-SBC preferably communicates a minimum of every five seconds to ensure that if the VCP has corrupted data that the data can be reconstructed (send totalizers and current selection to VCP). If the VCP receives a bad packet, it will ignore the packet and not respond. The CE-SBC should then timeout and resend the message, continuing this process until a valid response has been received. If a VCP response has not been received within five seconds, a message should be displayed on the status line of the display.

The device connected to COM 4 is the RF Modem or RFM. The RF Modem is used by the gateway server to poll the CE-SBC. The CE-SBC uses the RFM to communicate with the gateway server using a comma delimited ASCII packet structure.

The gateway server should communicate with the CE-SBC a minimum of every four hours. Communication starts with the gateway issuing an appropriate command. If the SBC status returned does not indicate a low supply warning or a "cannot communicate with VSP" warning, then the totalizers are stored in the last totalizer read buffer and nothing more is done. If the gateway receives a low supply warning response from the CE-SBC, it will then, after storing away the totalizers, issue an appropriate command. Upon storing the usage information, it will then initiate communications with the server of the order processing system. If a "cannot communicate with VSP" warning is indicated, then the gateway will also initiate communication with the server of the order processing system.

If at any time the gateway server receives a bad packet it will ignore the packet and not respond. The gateway should then timeout and resend the message, preferably continuing this process a maximum of four times. If after the fourth time, a good packet has not been received, the gateway preferably waits for the next scheduled communication session to try again. If a valid packet still has not been received after the second communications session, the gateway server preferably notifies the server of the order processing system.

If the CE-SBC receives the gateway status indicated "unable to contact the central server," then a message should be displayed on the status line of the display. The gateway server communicates with the server of the order processing system on demand or at a minimum of every three days. All communication with the central server is preferably initiated by the gateway server.

If at any time the server of the order processing system receives a bad packet it will ignore the packet and not respond. The gateway server should then timeout and resend the message, continuing this process a maximum of four times. If after the fourth time a good packet has not been received, the gateway preferably waits for the next scheduled communication session to try again. If the server of the order processing system has not received a good data packet within three days, a warning is preferably issued on the server of the order processing system.

In this embodiment, a back office application is in charge of answering calls for the server of the order processing system. This application is also responsible for populating an access database with information provided by the gateway server. This application may change to a client/server SQL application. The application will display the information from the last call. Two database tables will be used, customer and dispenser data.

Operation of the System

Figure 8B:
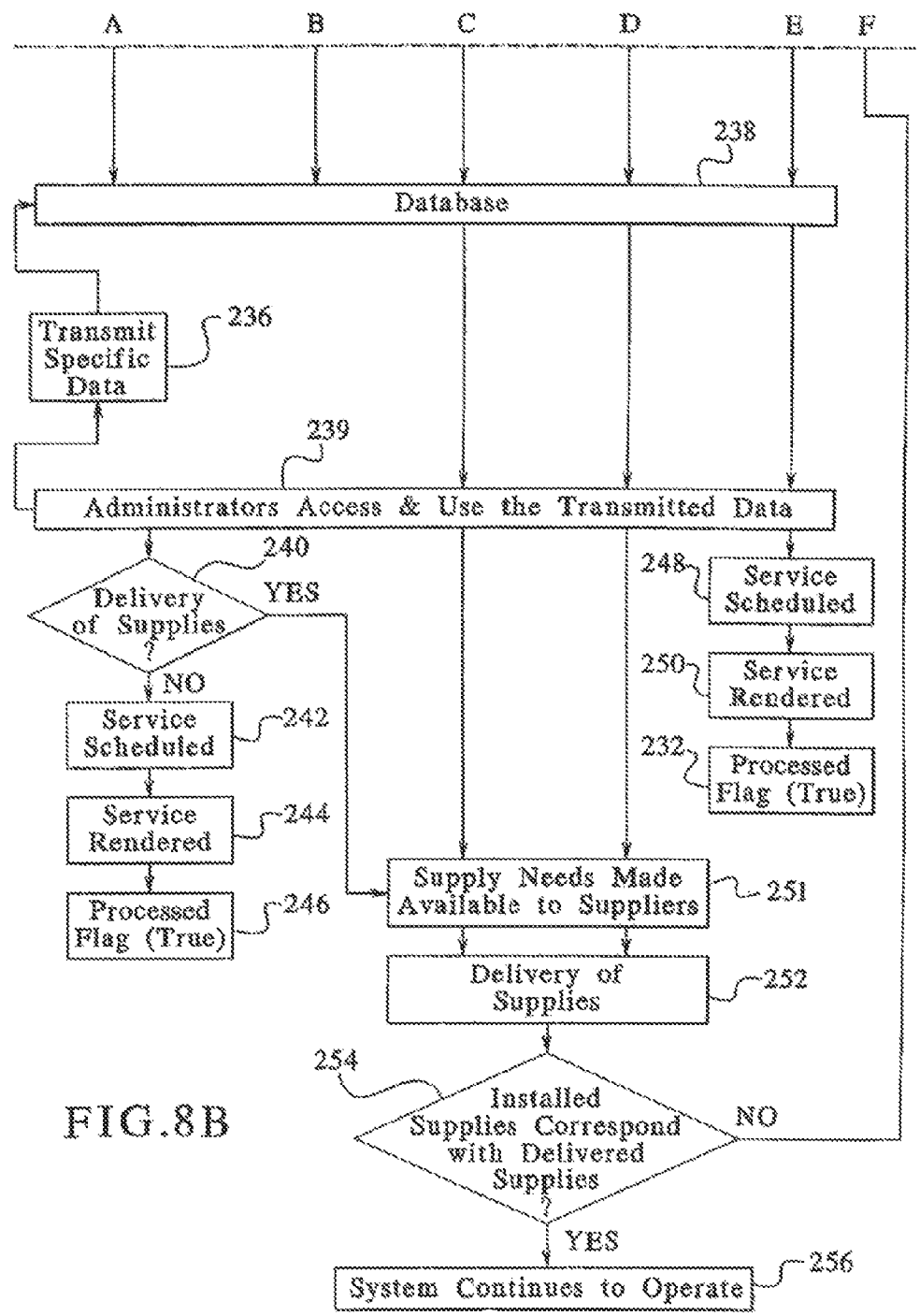

Referring now to FIGS. 8, 8A and 8B, to use the system 10 of the present invention, a user must purchase an appliance containing the dispensing apparatus 28 as indicated by block 200, or purchase an appliance conversion kit as discussed below. After the appliance is delivered and installed (or the conversion kit is installed), the user opens an account with the system implementor who operates the order processing system as indicated by block 202. The user preferably opens an account with the system implementor using a registration process provided through the user interface panel. The touch screen interface panel preferably displays a keyboard through which the user registers. The registration process includes entering user information, supply selections and user credit card information. During the registration process, the entry of the zip code of the user will preferably, but not necessarily, determine the supplier of the products and supplies for the user. It should be appreciated that alternative registration processes may be employed in the system of the present invention such as registration by telephone, mail or the internet (via a stand-alone or networked internet access device).

It should be appreciated that appliance manufacturers such as General Electric and Whirlpool are currently working on incorporating computer systems into their appliances. Such computer systems include interfaces and processors. The present invention could be incorporated into such systems. For instance, GE is currently planning to use a Windows CE computer interface architecture and Whirlpool is currently planning to use a Sun Microsystems-Java architecture. It should be appreciated that the present invention may be adapted for either system or any other suitable appliance computer system.

The dispensing computer 24 may be initialized or configured during installation or during the first communication with the order processing system 14 during which the order processing system 14 transmits set-up data or files to the dispensing or appliance computer 24 as indicated by block 204. The set-up data or files preferably include appliance supply information, computer programs, graphic files, advertisements and messages as described above. The registration process described above is part of the initial set-up process.

During the initialization process or the registration process, the user will order a plurality of appliance supplies and will need to agree to a price for the supplies. The user interface will provide pricing information to the user for enabling the user to make the determination as to which supplies the user will order. It should be appreciated that the prices may be different in different regions and that the suppliers or local distributors may need to set the prices. This information is preferably delivered to the user via the order processing system. It should also be appreciated that the prices may change. The system will preferably send any price change message to the dispensing computer and display the price changes to the user in the message screen or interface discussed above. The user will need to agree to the price changes. The user's agreement to the price changes is transmitted to the order processing system. It should also be appreciated that the order processing system may provide a web site and other communication means such as a toll-free number as discussed above to enable the user to determine prices, obtain help or find out more information about the use of the system.

In one alternative embodiment of the present invention, the dispensing or appliance computer 24 generates a warning message if, after the elapse of a pre-determined warning time, the dispensing or appliance computer 24 has not communicated with order processing system 14 as indicated by diamond 206. The warning time may be any period of time, though preferably it is three days. The warning message appears on screen 34 to alert the user of a communication problem, as indicated by block 208. The warning message may be in audio, video or textual form or any combination thereof.

In the alternative embodiment, after generation of a warning message, either the shutdown time elapses without a communication or a communication occurs before shutdown time elapses. Shutdown time may be any period of time greater than the warning time, though preferably seven days. As indicated by diamond 210, if the shutdown time elapses without a communication, the appliance supply distribution and dispensing system 10 shuts down as indicated by block 212. If a communication occurs before the elapse of warning time or shutdown time, a subsequent communication can be initiated.

The user may initiate a communication with the order processing system 14 to place an order for supplies, to change the type of appliance supply the user desires or for any other suitable purpose as described in detail above and as indicated by block 214. The dispensing or appliance computer 24 may also initiate communications with the order processing system 14 based on its monitoring of the dispenser and dispensing apparatus.

The dispensing or appliance computer 24 determines if there is a low appliance supply for any one of the plurality of appliance supplies in the appliance, or a technical, electrical or mechanical problem with the dispensing apparatus or dispensing computer, as respectively indicated by blocks 218, 220 and 222. The dispensing computer communicates these events to the order processing system. Additionally, at regular intervals (preferably every seven days), the dispensing or appliance computer communicates the status of the dispensing apparatus (including usage or supply levels) and the dispensing or appliance computer to the order processing system, as indicated by block 216.

Preferably, a low appliance supply event exists when the appliance supply is within a certain amount of days of depletion based on the user's average consumption or use, preferably in the range of two to three days as discussed below. It should be appreciated that the appliance supply can be any type of supply, including, without limitation, liquids, solids such as powders, gases and replacement parts. It should also be appreciated that the dispensing computer can order appliance supply at any predetermined time, as otherwise set by the implementor or as ordered by the user.

In one embodiment of the present invention where supplies are mixed or combined, a predetermined amount of one supply is delivered to the user with the other supply based on the use of the second supply. In an alternative embodiment of the present invention, the first supply level is directly monitored, the dispensing computer monitors the time the first supply release mechanism is open in addition to monitoring the time second supply is dispensed. The dispensing computer determines the first supply level from this data. It should be appreciated that the dispensing computer is adapted to calculate use of first supply such as a gas for powering pumps or for other purposes such as pressuring drink supply canisters in this calculation.

For any embodiment, a technical problem event 222 exists at any time the dispensing apparatus 28 (or appliance) is in need of repair, or there is a communication problem between the dispensing computer and the order processing system 14.

Referring now also to FIG. 9, the communications between the dispensing computer and the order processing system include predetermined basic information generally including the identification of the dispensing apparatus 28, the amount of appliance supply and the purpose for the communication. Preferably, such information will include at a minimum, the basic data 300 identified in FIG. 9, which includes: (i) a dispensing apparatus unit identification 302; (ii) an appliance supply identification 304; (iii) the appliance supply amount 306; (iv) the event identification 308; (v) usage information 310; and (vi) set-up files or other information.

Preferably the average daily usage is calculated for each appliance supply and used to re-order appliance supply to maintain an adequate supply for the user at all times. In the refrigerator embodiment discussed below, preferably the dispensing computer also calculates the total carbonated and non-carbonated drink supply to maintain $CO_2$ usage and to maintain an adequate $CO_2$ supply. In the embodiment having one $CO_2$ container which is used for several beverages, if the beverages are used evenly, the $CO_2$ supply will be depleted before any one of the individual drink supplies. The dispensing computer accounts for this and all other appliance supply use scenarios. Accordingly, it is preferable to have at least one spare $CO_2$ supply container maintained by the user.

The dispensing computer will track the canister levels for each appliance supply that is installed in the dispensing apparatus. This is accomplished by tracking the time in seconds each appliance supply is dispensed. Using the constant flow rate of a dispensed appliance supply along with the time the appliance supply has dispensed, a relatively accurate canister level can be calculated when required. The constant flow rate is given by knowing the regulated psi and inner diameter of the dispensing hose or line.

In another embodiment, the usage information 310 includes a modified thirty day average of the amount of each supply dispensed. In particular, the average daily consumption is based upon normal use during a period of time such as thirty twenty-four hour periods. Abnormal periods of usage which may occur when the user has an event or when the user is on vacation are preferably ignored in this calculation. The basic data 300 is transmitted to the order processing system 14 and stored in the appropriate database 14c as indicated by block 224.

When a communication is caused by a low appliance supply, the dispensing computer 24 transmits an order for the appliance supply to the order processing system 14 as indicated in block 226. This order includes the appliance supply identification 304 and preferably the number of containers of appliance supply needed.

In one embodiment of the invention, the system 10 prevents the user from installing supplies which were not ordered by the dispensing computer 24. In this embodiment, the user must enter into the dispensing computer 24 an appliance supply authorization code which was included in the supply shipment. The appliance supply distribution and dispensing system 10 will not dispense any new appliance supply unless the appliance supply authorization code has been entered. The order processing system 14 generates and stores an appliance supply authorization code for such order and transmits the code to the dispensing computer when the order processing system receives the order. Alternatively, the dispensing computer could create the code or be preloaded with codes. When the appliance supply is prepared for delivery to a user, the appliance supply authorization code is associated with the appliance supply containers. Preferably, the appliance supply authorization code is a twelve digit number encoded on the containers of the appliance supply.

In another embodiment, the dispensing computer tracks the amount of appliance supply that is ordered from the order processing system. If the appliance supply installed into the dispenser is not the appliance supply that was ordered or if the amount of a particular type of appliance supply exceeds the amount that was ordered, the dispensing apparatus may be adapted to shut down or display an error message. One reason for tracking of supplies is to verify that the appliance supply originated from a legitimate source. This will prevent the user from obtaining appliance supply from unauthorized third party sources. If more appliance supply is installed into the dispenser compared to the amount ordered, this would indicate that supplies are being obtained from outside sources.

In one embodiment of the present invention, each appliance supply has a unique four digit appliance supply ID. The first two digits indicate the type of appliance supply classification and the second two digits indicate the appliance supply within the classification. These IDs are assigned by the system implementor. When the user selects an appliance supply from the selection screen, they are indirectly selecting the appliance supply canister with the associated appliance supply ID number. When the CE-SBC informs the gateway server of the class IDs, it also sends the associated appliance supply IDs along. If a user changes from one appliance supply to another appliance supply, dispensing computer will know that one of the appliance supply canisters is to be replaced upon the next order.

In one embodiment when the user is attempting to change an empty canister, the user will press a change canister button and the CE-SBC will automatically lock the dispenser and display the appropriate message in the bottom status bar. Once the user has made the switch and double checks all the hose connections, the user will press the OK button, the CE-SBC will then unlock the dispenser and remove the status message. If the user at any time cancels the operation by any means, the CE-SBC will also unlock the dispenser.

When a communication is caused by a technical problem, dispensing computer 24 transmits an order for repair service to the order processing system which is also as indicated by block 226. This order includes a service identification and an alarm. The service identification includes an identification of the specific type of service needed, and preferably a numeric or alphanumeric code identification. The service identification also includes a description of the service needed. The alarm alerts the user that a technical problem has occurred as indicated by block 230. The alarm is preferably a visual or textual message generated on panel 34.

As indicated by block 228 in FIG. 8, when dispensing or appliance computer 24 transmits an automatic order to order processing system 14, a process flag is set as false and stored in the database 14*c*. As indicated by block 232 and discussed in detail below, the process flag is set as true when the supplies or services requested by the triggering event have been provided or rendered to the user.

In all communications, the dispensing or appliance computer 24 transmits the basic data 300 to the order processing system 14 through the dispensing communication channel 16. Dispensing or appliance computer 24 also transmits specific data 312 to the order processing system 14, associated with specific activities, as indicated by block 234. Server or processor 14*b* inputs the basic data 300 and specific data 312 in the database 14*c*. In certain communications, as indicated by block 236, the order processing system 14 will transmit certain data, images and electronic files to the dispensing computer 24. Graphic images are preferably transmitted using JPEG type files, and movies are preferably transmitted using MPEG type files as indicated above.

As further illustrated in FIG. 9, database 14*c* preferably stores several types of data 413 including user data 314, supplier data 316, dispensing apparatus data 318, dispensing computer setting data 320, appliance supply data 322, event data 324 and service data 326.

User data 314 preferably includes a user identification code, a supplier identification code, the company name if the user is a business, a dispensing apparatus unit identification code, the last name of the user, the first name of the user, the street address of the user, and the city, state, zip code and phone number of the user. User data 314 may also include other information such as demographics on individual household members, visitors and others in addition to data about the user who opened an account to use the appliance supply distribution and dispensing system 10.

Supplier data 316 preferably includes a supplier identification code and the company name of the supplier. Dispensing apparatus data 318 preferably includes a dispensing apparatus unit identification code, a plurality of appliance supply identifications and associated appliance supply levels for each appliance supply dispensed by the dispensing apparatus and the dispensing computer setting identification code. The number of appliance supply levels will depend on the number of appliance supply containers used by the dispensing apparatus and the number of different uses made of the appliance. This information will be contained in the dispensing computer and transferred to the order processing system during initialization. Dispensing computer setting data 320 preferably includes a dispensing computer setting identification code and a dispensing computer setting. Appliance supply or concentrate data preferably includes an appliance supply identification code, the appliance supply name and the logo of the appliance supply.

Event data 324 preferably includes: (i) an identification code of events for a low appliance supply and a technical problem; (ii) a date and time stamp for recording the event occurrence; (iii) the type of event; (iv) the number of appliance supply containers needed; (v) the appliance supply authorization code; (vi) a service identification code; and (vii) a process flag (true or false).

Service data 324 preferably includes a service identification code and a description of the service. It should be appreciated that the basic data and additional data recited above is preferred and that other data could be included in the appliance supply distribution and dispensing system 10 of the present invention.

If the user initiated the communication session as indicated in block 214 in FIG. 8, the basic data and the additional specific data is transmitted to the order processing system and stored in database 14*c*, as indicated by block 238. The administrative computer operators may be employed by the dispensing system implementor to provide customer service and generally manage the data on database 14*c*. Administrative computer operators may obtain specific information about a user by accessing the database, as indicated by block 239, or reviewing completed product registration forms, speaking with the user over the telephone, e-mail or through other communication methods. The administrative computer operators may add to database 14*c* specific data which they gather, as indicated by block 236.

When the order processing system 14 receives an appliance supply order, the order processing system 14 preferably communicates the order to supplier system 18 designated to serve the particular user. Alternatively, when such an order is received by the order processing system 14, an administrator may communicate the order to a supplier system 18 designated to serve a particular user as indicated by block 238.

If a user places an order for service instead of supplies, the administrator contacts the user and schedules a service date as indicated by block diamond 240 and block 242. A supplier or third party repair service may render the service as indicated by block 244. After the repair services have been rendered, process flag is set as true, as indicated by block 246. Repair services are similarly scheduled, rendered and processed if the dispensing computer alone detects a technical problem, as indicated by blocks 248, 250 and 232.

The supplier system 18 facilitates the delivery of the ordered supply, to the user, as discussed below. The system places the order or makes the supply needs known to the appropriate supplier, as indicated by block 251. One of the supply systems delivers the supplies to the user as also indicated by block 251 and the user then installs the appliance supply in the appliance. If the monitoring system or dispensing or appliance computer 24 determines that the appliance supply delivered and installed corresponds to the appliance supply ordered as indicated by block 252 and diamond 254, the appliance supply distribution and dispensing system 10 continues to operate, as indicated by block 256.

If the installed appliance supply does not correspond to the order, the dispensing apparatus 24 may be adapted to shut down as indicated by block 212. When a shut down occurs, electrical power is blocked so that the dispensing apparatus 28 will not dispense any appliance supply.

Supplier system will use a reliable deliverer (not shown) to deliver the appliance supply containers to the user. Deliverer may be an employee of supplier or a reliable outside package delivery company such as the United Parcel Service, Federal Express, the postal service or other similar delivery organizations. Deliveries will be made to the place of delivery within a certain delivery time, preferably within three days after an order or communication is transmitted to the order processing system. Preferably each delivery of appliance supply includes at least two containers of appliance supply.

Dispensing or appliance computer 24 monitors the amount of each type of appliance supply dispensed and calculates the amount of each appliance supply used. Each time an order or low appliance supply message is transmitted to the order processing system 14, dispensing computer 24 tracks the amount of appliance supply ordered.

It should also be appreciated that a conversion kit may be used to convert a standard appliance into an appliance having the dispensing apparatus of the present invention. Such a conversion kit may include a stand-alone unit which has a separate power source and various fluid lines connecting to the appliance.

It should also be appreciated that the system could be adapted to dispense concentrated, non-concentrated, ready-to-drink or pre-mixed appliance supplies such as milk, beer, wine and juices for refrigerator embodiments, liquid or powder detergents for washing machine embodiments and other supplies for other appliances. As mentioned above, it should be appreciated that any embodiment of the appliance supply distribution and dispensing system could be adapted for a powder or solid drink supply.

Furthermore, although the system of the present invention is described herein at times as including a supply dispensing computer and a supply dispenser, it should be appreciated that the present invention can include any type of supply monitoring or appliance computer. Moreover, the system need not include a supply dispenser or any type of dispenser because the system can support appliance supplies which cannot be dispensed. Examples of such appliance supplies are replacement parts, such as filters, batteries or light bulbs. Other examples are water softeners and other products which are immersed in water and which slowly dissolve with time. The system of the present invention can be adapted to monitor the use and depletion of these types of supplies and any other type of appliance supply.

Refrigerator Embodiment

Figure 10:
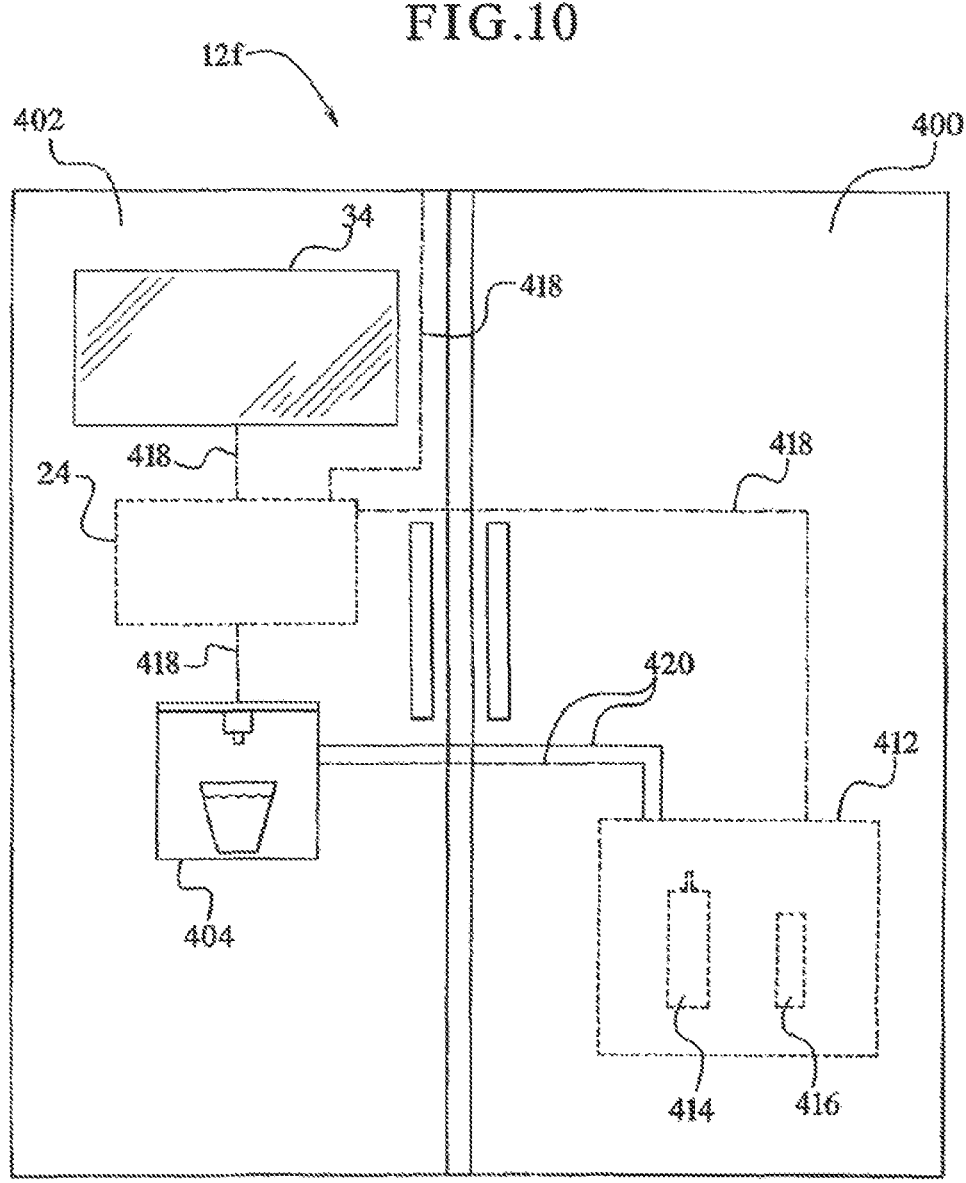
FIG. 10 is a top plan view of one refrigerator embodiment of the present invention.

As illustrated in FIG. 10, in one embodiment of the present invention, the appliance 12f which houses the appliance supply dispensing apparatus 28 is a conventional refrigerator which includes a refrigeration compartment (not shown), a refrigeration compartment door 400, a freezer compartment (not shown) and a freezer compartment door 402. Refrigerator 12f may be constructed in various shapes, sizes, designs and models including side-by-side door models as illustrated in FIG. 10 and upper and lower door models (not shown). Refrigerator 12f preferably includes standard mechanisms and cooling systems present in commercially available appliances. However, refrigerator 14a is specifically constructed, structurally and electrically, to house and accommodate a supply dispensing apparatus 28 for refrigerators and its functions and use as described herein.

Figure 11:
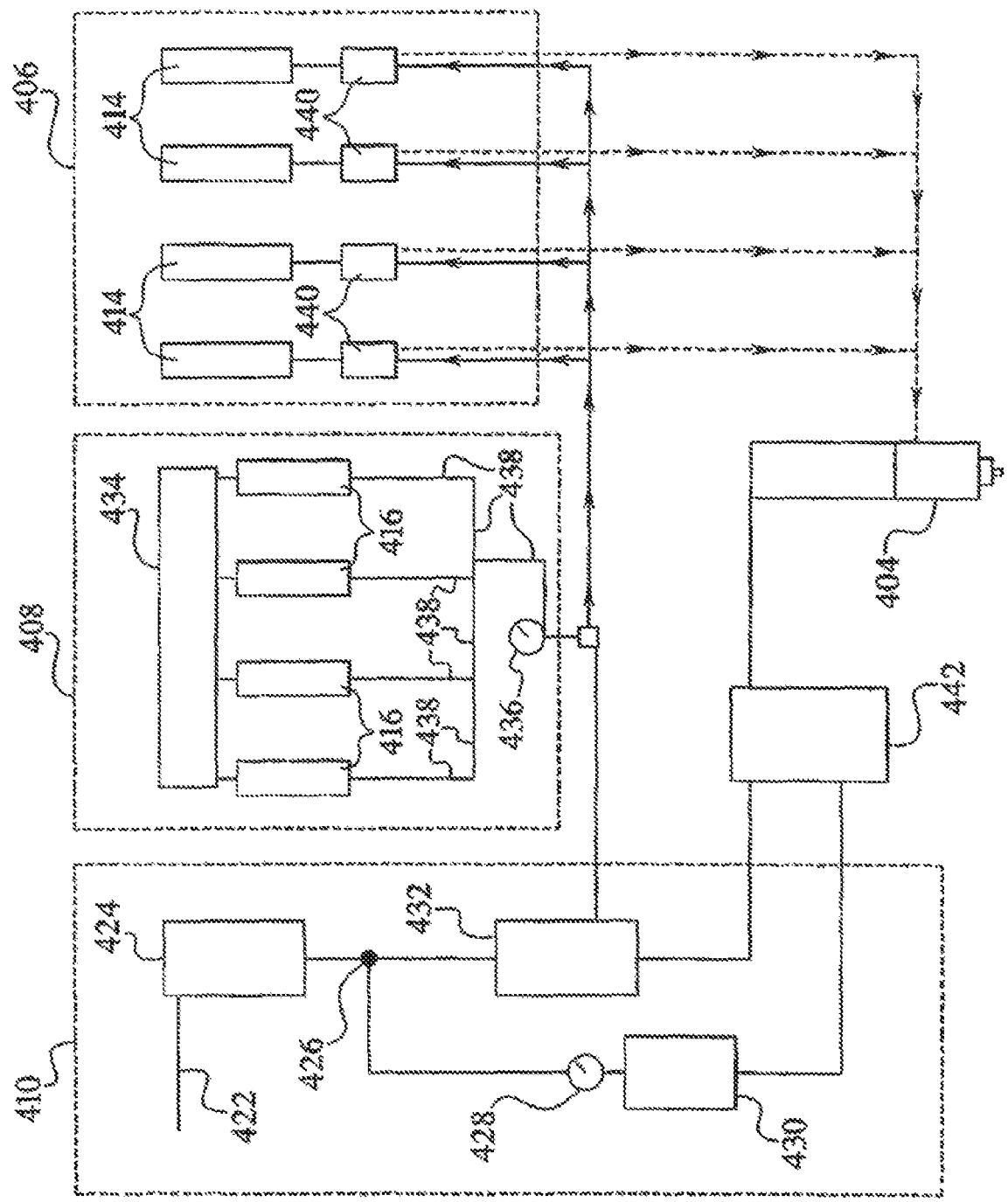
FIG. 11 is a schematic diagram of one refrigerator embodiment of the present invention.

Referring now to FIGS. 10 and 11, the supply dispensing apparatus 28 for refrigerators includes: (i) a supply dispensing computer or processor 24; (ii) a user interface panel or terminal 34; (iii) a dispenser or beverage mixing mechanism 404; (iv) a drink supply mechanism or apparatus 406; (v) a $CO_2$ supply mechanism or apparatus 408; (vi) a water supply mechanism or apparatus 410; (vi) a housing 412 for storing a plurality of containers 414 and at least one $CO_2$ supply container 416; (vii) a plurality of electrical communication lines 418; and (viii) a plurality of water, drink supply and $CO_2$ supply fluid communication lines 420. These components, including the $CO_2$ supply mechanism 408 and drink supply mechanism 406, are preferably mounted at suitable places in refrigerator 12f; however, it should be appreciated that one or more of these components could be mounted in a housing adjacent to the refrigerator in accordance with the present invention.

In one refrigerator embodiment of the present invention, the dispenser 404, the dispensing computer 24 and the panel 34 are mounted in the freezer compartment door 402, and the housing 412 for the drink supply containers 414 and the $CO_2$ supply container 416 is mounted in the refrigeration compartment of the refrigerator 12f as generally illustrated in FIG. 10. This embodiment enables the dispenser 404 to dispense ice from the door 402 of the freezer compartment as in conventional refrigerators and enables the drink supply containers 414 to be maintained at the desired temperature in the refrigeration compartment. However, this embodiment requires that the drink supply containers 414 be connected to the dispenser 404 through a plurality of fluid communication lines 420 and electrical communication lines 418 suitably mounted between the refrigeration compartment and the freezer compartment door 402. If the housing 412 is mounted in the refrigeration compartment door 400, the fluid communication lines 420 and electrical communication lines 418 must be suitably mounted between the refrigeration compartment door 400 and the freezer compartment door 402 through the refrigeration compartment and the freezer compartment.

In alternative refrigerator embodiments of the present invention, the housing 412 for the drink supply containers 414 and $CO_2$ supply container 416 is mounted in an insulated area in the freezer compartment or the freezer compartment door 402 of the refrigerator. The insulated compartment prevents the drink supply from freezing due to the lower temperatures in the freezer compartment. The embodiment in which the housing 412 is located in an insulated area in the bottom of the freezer door 402 provides the additional advantage of a direct connection between the dispenser and the drink supply and $CO_2$ supply mechanisms without having one or more fluid communication lines 420 or electrical communication lines 418 extending from the freezer compartment to the freezer compartment door 402. Moreover, this embodiment may be advantageous because freezer doors are generally less utilized and this embodiment facilitates a more direct connection with less parts and less potential problems (such as failures) between the drink supply and dispenser. This embodiment further facilitates a lower cost of manufacture.

The drink supply containers 414 preferably hold one liter of drink supply as discussed in more detail below. The drink supply containers 414 and $CO_2$ gas supply container 416 are suitably sized to fit within the housing 412. The housing 412 is preferably adapted to hold six one-liter drink supply containers 414 and at least one seventy-eight gram $CO_2$ supply container 416, canister or cartridge. One refrigerator embodiment of the housing 412 would take up less space than in the refrigerator compartment or the insulated freezer area than such containers.

In this refrigerator embodiment of the present invention, the system enables a user to better utilize the space in the user's refrigerator. In particular, in current refrigerators, the typical user has a plurality of beverage containers including carbonated and non-carbonated drink.

More specifically, in one refrigerator embodiment of the present invention, the water supply mechanism 410 includes a conventional incoming water supply 422 connected to the refrigerator 12f. The incoming water supply 422 is connected to a suitable water pump 424 which regulates the water pressure as necessary. Preferably, the water pump 424 is a commercially available Sureflo™ 115V AC pump, although any suitable pump which regulates the water pressure to at least one-hundred pounds per square inch is acceptable. The water pump 424 is connected to a two-way valve 426 which connects the water supply 422 to a water pressure regulator 428, a holding tank 430 and a carbonating tank 432.

The water pressure regulator 428 decreases the water pressure to a preferred manageable water pressure of fifty pounds per square inch. The preferred water pressure regulator is a Sureflo™ 50 PSI regulator, although any standard regulator may be employed. The holding tank 430 holds a reserve water supply and is connected to the dispenser 404. The water in the holding tank 430 is chilled and maintained at a relatively cool temperature by the refrigerator. When water is dispensed or more than one serving of drink is dispensed at any one time, the dispenser 404 uses the water from the holding tank 430. Alternatively, the water supply 422 may bypass the holding tank and be connected to the dispenser.

The water supply mechanism 410 also includes a carbonating tank 432 which mixes the water from the water supply 422 with the $CO_2$ gas from the $CO_2$ supply mechanism 408 to create a carbonated water supply connected to the dispenser 404. Carbonating tank 432 is any type of container which can withstand the pressure needed to carbonate water at the desired pressures. Carbonating tank 432 includes a conventional safety valve (not shown) which exhausts to the atmosphere whenever the pressure inside carbonating tank 432 exceeds a predetermined pressure limit. The safety valve closes when the pressure inside carbonating tank 432 is below a predetermined pressure limit. Carbonating tank 432 also includes a conventional back flow preventer (not shown) which prevents carbonated water supply from entering the water supply 422. Accordingly, the water supply mechanism 410 supplies water to the dispenser 404 as necessary.

The $CO_2$ supply mechanism 408 includes a housing for preferably storing $CO_2$ supply containers and in an alternative embodiment, a plurality of $CO_2$ containers and a suitable mechanism for releasing the $CO_2$ from the $CO_2$ supply containers. The $CO_2$ supply mechanism 408 which provides $CO_2$ gas includes a $CO_2$ gas manifold 434, one or more $CO_2$ gas containers or cylinders 416, and a $CO_2$ pressure regulator 436 connected by a plurality of gas lines 438. The $CO_2$ gas supply cylinders, cartridges or containers 416 safely store $CO_2$ gas at a range of eight hundred to one thousand pounds per square inch. Preferably, $CO_2$ gas containers 416 hold less than one hundred grams of $CO_2$ gas. In one preferred embodiment of the present invention the $CO_2$ containers hold seventy-eight grams or less of $CO_2$. This size $CO_2$ cartridge will on normal use be sufficient for carbonating the drinks made from two one-liter drink supply containers. Additionally, applicable shipping restrictions restrict the weight of individual canisters of $CO_2$ gas or other pressured gas containers by normal delivery services. It should be appreciated that the shipping regulations allow a plurality of $CO_2$ containers, each holding seventy-eight grams or less of $CO_2$ gas, to be shipped in the same box or packaging. Thus, several $CO_2$ containers can be shipped to the user in a single package along with the drink supply containers. It should also be appreciated that the $CO_2$ container size and pressure requirements and methods of shipment could vary in accordance with the present invention.

In one refrigerator embodiment of the present invention, the $CO_2$ gas is preferably stored in $CO_2$ gas cylinders 26b at relatively high pressures such as eight hundred pounds per square inch and the $CO_2$ gas cylinders are connected to a $CO_2$ gas manifold 434 which equalizes the pressure in the $CO_2$ gas cylinders. The $CO_2$ gas manifold 434 is preferably adapted to hold $CO_2$ gas at a maximum pressure of one thousand pounds per square inch, preferably eight hundred pounds per square inch.

The manifold 434 is preferably connected to one or more $CO_2$ gas lines 438 which route the $CO_2$ gas from $CO_2$ gas manifold 434 to the $CO_2$ pressure regulator 436. The $CO_2$ pressure regulator 436 preferably is a conventional regulator capable of regulating or decreasing the pressure of the $CO_2$ gas to a reduced $CO_2$ pressure in the approximate pressure range of forty to sixty pounds per square inch and preferably fifty-five pounds per square inch.

In one refrigerator embodiment of the present invention, the dispensing apparatus includes a two-way $CO_2$ valve (not shown) in the gas line 438 which connects the manifold 434 to the carbonating tank 432 and the drink supply pumps 440 as discussed below. The $CO_2$ gas routed to carbonating tank 432 enters carbonating tank 432 at its reduced $CO_2$ pressure and mixes with the water supply at an increased water pressure in order to produce a carbonated water supply.

$CO_2$ gas becomes excited as its temperature rises. When carbonated drinks are dispensed and poured, the $CO_2$ gas escapes in a "fizz" which detracts from the taste and pleasure of carbonated drinks. The lower the temperature of the carbonated water supply, the less $CO_2$ gas escapes. Therefore, it is preferable to use a cold carbonation process employing a cold plate 442 to rapidly decrease the temperature of the carbonated water supply. The cold plate 442 is preferably connected to the carbonated water supply to chill the carbonated water as it exits the carbonating tank 432. The cold plate 442 preferably includes one or more metal tubes which are routed through a metal block. Preferably the metal tubes are made of stainless steel and the metal block is made of aluminum or steel. Cold plate 442 may be of any suitable size, though the preferable size is eight x twelve x two inches. Whether or not a cold plate 432 is included in dispensing apparatus 28, the carbonated water supply is routed to dispenser 404.

The drink supply mechanism 406 supplies a plurality of drink syrups from the plurality of drink supply containers 414. The drink supply mechanism includes a housing for storing a plurality of drink supply containers and at least one pump or other suitable mechanism for drawing the drink supply from the drink supply containers 414. In one embodiment of the present invention, at least one and preferably a plurality of drink supply pumps 440 are connected to the drink supply containers 414. The drink supply pumps 440 operate on $CO_2$ gas in the range of zero to seventy pounds per square inch and create a vacuum to draw drink syrup from the drink supply containers 414 in a conventional manner. Drink supply pumps 440 have one or more inlets for $CO_2$ gas and drink syrup in addition to one or more outlets for $CO_2$ gas and drink syrup. The dispensing computer 24 is electrically connected to and operates a conventional $CO_2$ release mechanism (not shown) when a user presses one of the drink selections on the primary interface 40a. Thus, in one embodiment of the present invention, each drink supply container is connected to a pump which is adapted to draw the drink syrup through the fluid communication lines to the dispenser when the user request one of the drinks by touching the drink logo on the touch screen. In an alternative embodiment, the pumps are directly electrically connected to the dispensing computer. These embodiments preferably include a collapsible plastic bag in a box (known in the industry as a bag-in-box or B.I.B.). The plastic bag collapses as drink syrup is drawn out of the bag. In this embodiment of the present invention, the plastic bag drink supply container is protected by a cardboard box.

In an alternative embodiment of the present invention, the dispensing apparatus does not include pumps for the drink supply containers. In this alternative embodiment, the cap of the drink supply container includes a gas supply inlet tube and a drink supply outlet tube. When the dispenser is activated, the $CO_2$ gas is forced into the drink supply container through the gas inlet tube and the drink supply is forced out of the container through the drink supply outlet tube. The pressure of the $CO_2$ forced into the drink supply container is approximately five to ten pounds per square inch ("psi"), and accordingly, does not provide sufficient pressure to carbonate the drink supply. The present invention thus contemplates a pumpless system for facilitating the supply of drink supply to the dispenser.

The drink supply container of this refrigerator embodiment of the present invention could be any suitable container. In one alternative preferred refrigerator embodiment, each container is a one-liter plastic bottle similar to conventional one-liter plastic soft-drink bottles. A one-liter drink supply bottle will produce approximately two hundred and eighty-eight ounces of soft drinks (based on a five water to one syrup ratio) which is roughly equal to a case of or twenty-four twelve ounce cans of soft drink. For other drinks such as juices where the ratio of juice to water is higher (i.e., three to one), a one-liter drink supply will produce approximately one hundred and seventy-two ounces.

Referring back to FIG. 11, the reserve water supply, the carbonated water supply and drink syrup are routed to the dispenser 404. The dispenser 404 includes a plurality of relatively small tubes or passageway (not shown) which carry the carbonated water supply, reserve water supply and drink syrup to a dispensing valve (not shown). Dispenser 404 may be any suitable dispenser having a system of tubes leading to a valve or outlet, although the dispenser is preferably solenoid activated. This dispenser preferably includes eight tubes and eight solenoids which includes one solenoid for each of the six drink supply containers, one solenoid for carbonated water and one solenoid for non-carbonated water. Accordingly, two solenoids are opened to dispense a drink as the drink is mixed or carbonated on the fly.

An alternative refrigerator embodiment of the present invention could include one or more mechanical dispensing buttons for dispensing drinks mounted on the order panel or adjacent to the dispenser. Dispensing buttons are electrically connected to butterflies which are connected to dispensing valves. When a user pushes a dispensing button, the associated butterfly opens the associated dispensing valve to dispense the water or type of drink corresponding to the user's selection. When the user pushes a dispensing button for a drink, butterflies operate dispensing valves, and the appropriate drink supply and the carbonated water supply flow into the nozzle of the dispenser. Drink supply and carbonated water supply are mixed inside the nozzle.

A specific carbonated water supply to drink supply ratio or brix must be met in order for the drink to provide the proper flavor and pleasure. For soft drinks, the preferred brix of carbonated water supply to drink supply is five to one. For juices, the preferred brix of carbonated water supply to drink supply is three to one.

One refrigerator embodiment of the present invention contemplates an autobrix system or automatic brixing. The automatic brixing system would enable the user to readily switch between carbonated and non-carbonated beverage supplies. Another embodiment of the present invention contemplates a manual brix adjustment system. In a manual system, if a drink selection changes from carbonated to non-carbonated, a technician may need to adjust the manual system by screwing or unscrewing flow control screws located in the dispenser in a conventional manner.

Washing Machine

One washing machine embodiment of the present invention includes a dispenser, detergent supply mechanism and a plurality of commercially available pumps, tanks, regulators, valves and fluid lines which co-act to provide and dispense one or more detergents. It should be appreciated that the structure and components of the dispensing apparatus could vary in accordance with the present invention.

Although not shown, the dispensing apparatus housed in any appliance could include a bar code reader or other label recognition system which reads a bar code or other label on supply containers. The bar codes or other labels would include pertinent information regarding the supply. When the user replaces the supply, the bar code reader would read the bar code or label and would know that a new or replacement supply is being placed in the housing. The dispensing or appliance computer can then update the supply tracking data. The supply containers will preferably come with detailed instructions which describe how the user should replace the container and which containers to replace.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. An appliance comprising:
    a housing;
    a dispenser supported by the housing;
    a water supplier supported by the housing and connected to the dispenser;
    a drink supplier supported by the housing and connected to the dispenser, said drink supplier configured to removably hold a plurality of drink supply cartridges;
    a user interface panel supported by the housing, said user interface panel including a touch screen; and
    a computer supported by the housing and connected to the dispenser and the user interface panel, said computer configured to:
    (a) cause the user interface panel to display a plurality of different beverage images, each different beverage image associated with a different one of a plurality of different beverages, a plurality of the different beverages corresponding to a different one of the plurality of drink supply cartridges held by the drink supplier, each drink supply cartridge containing drink supply,
    (b) cause the user interface panel via the touch screen to receive a plurality of inputs corresponding to said plurality of different displayed beverage images,
    (c) for each received input, cause the dispenser to dispense the beverage associated with a selected beverage image corresponding to said input, said beverage dispensed using at least the drink supply in the drink supply cartridge corresponding to said beverage associated with the selected beverage image, and (d) cause the user interface panel to display information regarding at least one of:
  (i) a consumption amount of drink supply from at least one of the plurality of drink supply cartridges; and
  (ii) a remaining amount drink supply in at least one of the plurality of drink supply cartridges.

2. The appliance of claim 1, which is a refrigerator.

3. The appliance of claim 1, wherein the dispenser is configured to mix, at a pre-determined level, the drink supply from the drink supply cartridge corresponding to the beverage associated with the selected beverage image and water from the water supplier to dispense the beverage associated with the selected beverage image.

4. The appliance of claim 3, which includes a $CO_2$ supplier supported by the housing and connected to the water supplier, wherein water from the water supplier is carbonated water.

5. The appliance of claim 1, wherein the drink supplier includes at least one pump for drawing, from each drink supply cartridge held by the drink supplier, the drink supply in said drink supply cartridge.

6. The appliance of claim 1, which includes a $CO_2$ supplier supported by the housing, connected to the water supplier, and configured to hold at least one removable $CO_2$ supply container.

7. The appliance of claim 6, wherein the water supplier includes a carbonating tank connected to the $CO_2$ supplier.

8. The appliance of claim 6, wherein the computer is configured to determine a volume of $CO_2$ dispensed from each $CO_2$ supply container held by the $CO_2$ supplier.

9. The appliance of claim 1, wherein the drink supply in each of the drink supply cartridges is a concentrate.

10. The appliance of claim 1, wherein the drink supply in each of the drink supply cartridges is a powder.

11. The appliance of claim 1, wherein the drink supply in each of the drink supply cartridges is a liquid.

* * * * *

UNITED STATES PATENT AND TRADEMARK OFFICE
CERTIFICATE OF CORRECTION

PATENT NO. : 8,290,616 B2  Page 1 of 1
APPLICATION NO. : 13/346204
DATED : October 16, 2012
INVENTOR(S) : Harry Lee Crisp, III It is certified that error appears in the above-identified patent and that said Letters Patent is hereby corrected as shown below:

In Claim 1, Column 27, Line 3, between "of" and "drink" insert --the--.
In Claim 1, Column 27, Line 6, between "amount" and "drink" insert --of the--.
In Claim 4, Column 27, Line 16, after "supplier," insert --and--.
In Claim 4, Column 27, Line 17, between "wherein" and "water" insert --the--.

Signed and Sealed this
Twenty-ninth Day of January, 2013

David J. Kappos
*Director of the United States Patent and Trademark Office*